US012462785B2

(12) United States Patent
Okamoto et al.

(10) Patent No.: US 12,462,785 B2
(45) Date of Patent: Nov. 4, 2025

(54) SIGNAL GENERATION PROCESSING DEVICE

(71) Applicant: National Institute of Information and Communications Technology, Koganei (JP)

(72) Inventors: Takuma Okamoto, Koganei (JP); Tomoki Toda, Nagakute (JP); Yoshinori Shiga, Koganei (JP); Hisashi Kawai, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 342 days.

(21) Appl. No.: 18/267,175

(22) PCT Filed: Dec. 17, 2021

(86) PCT No.: PCT/JP2021/046833
§ 371 (c)(1),
(2) Date: Jun. 14, 2023

(87) PCT Pub. No.: WO2022/145262
PCT Pub. Date: Jul. 7, 2022

(65) Prior Publication Data
US 2024/0062742 A1 Feb. 22, 2024

(30) Foreign Application Priority Data
Dec. 28, 2020 (JP) ................................ 2020-218755

(51) Int. Cl.
*G10L 13/027* (2013.01)

(52) U.S. Cl.
CPC .................................. *G10L 13/027* (2013.01)

(58) Field of Classification Search
CPC ..................................................... G10L 13/027
See application file for complete search history.

(56) References Cited

U.S. PATENT DOCUMENTS

2020/0074996 A1 3/2020 Hamada et al.
2024/0242705 A1* 7/2024 Wang .................... G10L 13/047
2025/0182739 A1* 6/2025 Nguyen Cong ........ G10L 13/08

FOREIGN PATENT DOCUMENTS

AU 2021340886 A1 * 3/2023 ............. G16B 20/20
CN 112786006 A * 5/2021 ............. G10L 13/04
(Continued)

OTHER PUBLICATIONS

Official Communication issued in International Patent Application No. PCT/JP2021/046833, mailed on Mar. 15, 2022.
(Continued)

*Primary Examiner* — Mohammad K Islam
(74) *Attorney, Agent, or Firm* — Keating & Bennett, LLP

(57) ABSTRACT

Provided is a signal generation processing device that achieves audio synthesis processing or image signal generation processing capable of obtaining high-quality audio signals or image signals while maintaining the speed of audio synthesis processing or image signal generation processing. In the signal generation processing device, the first sub-model unit to the N-th sub-model unit each performs training processing for training models included in the first sub-model unit to the Nth sub-model unit using noise levels included in different noise level ranges to obtain trained models. In other words, the signal generation processing device performs processing for each sub-model unit in parallel, thus allowing for performing the training processing at high speed. Further, during prediction processing, the signal generation processing device appropriately selects the sub-model units to be used and performs processing with the selected sub-models, thus allowing for performing audio synthesis processing and image generation processing with high accuracy.

9 Claims, 24 Drawing Sheets

(56) References Cited

FOREIGN PATENT DOCUMENTS

| | | | | | | |
|---|---|---|---|---|---|---|
| CN | 112786006 | B | * | 5/2024 | ............. | G10L 13/04 |
| JP | 2020-034683 | A | | 3/2020 | | |
| WO | WO-2022151930 | A1 | * | 7/2022 | ............. | G10L 13/10 |
| WO | WO-2022151931 | A1 | * | 7/2022 | ............. | G10L 13/04 |

OTHER PUBLICATIONS

Prenger et al., "Waveglow: A Flow-Based Generative Network for Speech Synthesis", in Proc. ICASSP, Oct. 31, 2018, 5 pages.

Chen et al., "Wavegrad: Estimating Gradients for Waveform Generation", arXiv:2009.00713v2, Oct. 9, 2020, 15 pages.

Kong et al., "Diffwave: A Versatile Diffusion Model for Audio Synthesis", arXiv:2009.09761v3, Nov. 24, 2020, pp. 1-17.

Ho et al., "Denoising Diffusion Probabilistic Models", arXiv:2006.11239v2, Dec. 16, 2020, pp. 1-25.

* cited by examiner

Up-sampling unit

SIGNAL GENERATION PROCESSING DEVICE

TECHNICAL FIELD

The present invention relates to processing technology for generating audio signals and image signals (for example, vocoder technology for synthesizing audio waveforms from acoustic features).

BACKGROUND ART

For text-to-speech (TTS) technology for synthesizing natural speech from text, in recent years, the introduction of neural networks has enabled high-quality audio synthesis. Various techniques have been also developed for vocoders used in such text-to-audio synthesis techniques.

For example, various models have been proposed for neural vocoders that synthesize audio waveforms from acoustic features. Among them, the technology disclosed in Non-Patent Document 1 (hereinafter referred to as "WaveGlow") is capable of synthesizing in real time and with high sound quality, and is attracting attention. However, WaveGlow has a problem that the number of model parameters is enormous, and the time required for training processing is long (for example, about 20 days are required even when many GPUs are used). In contrast to that, the diffusion stochastic neural vocoders disclosed in Non-Patent Documents 2 and 3 (the technology disclosed in Non-Patent Document 2 is referred to as "WaveGrad", and the technology disclosed in Non-Patent Document 3 is referred to as "DiffWave") have been developed; these diffusion stochastic neural vocoders (WaveGrad and DiffWave) achieve high-quality audio synthesis with a small number of parameters using small models.

WaveGrad and DiffWave models are neural network models that receive a signal obtained by adding weighted noise to an audio waveform signal and infer only the added noise component. WaveGrad and DiffWave models are each provided using one model. In one model with WaveGrad or DiffWave, in training, weights (data indicating weight values) are also inputted into the model and training is performed so as to correspond to weights that can take various values (real numbers) between 0 and 1. Also, in WaveGrad and DiffWave, in predicting (when audio synthesis processing is performed), only noise is first inputted into the model, and the noise component inferred by the model is subtracted from the input to obtain an inferred waveform. Next, adding noise with a slightly reduced level to the inferred waveform, inputting it to the same model (WaveGrad and DiffWave model (neural network model)), and then subtracting the noise component inferred again by the model from the input cause an inferred waveform to be obtained again. Repeating this process while gradually lowering the noise level causes a clean audio waveform signal to be finally obtained.

In waveform generation models such as WaveGrad and DiffWave, one of the points is how to synthesize aperiodic components of audio waveforms that cannot be obtained from input acoustic features; the noise component that cannot be removed to the end corresponds to the non-periodic component of the audio waveform. This allows waveform generation models such as WaveGrad and DiffWave to achieve high-quality audio synthesis processing with fewer model parameters than those of WaveGlow.

PRIOR ART DOCUMENTS

Non-Patent Documents

Non-Patent Document 1: R. Prenger, R. Valle, and B. Catanzaro, "WaveGlow: A flow-based generative network for speech synthesis," in Proc. ICASSP, May 2019, pp. 3617-3621.

Non-Patent Document 2: N. Chen, Y. Zhang, H. Zen, R. J. Weiss, M. Norouzi, and W. Chan, "WaveGrad: Estimating gradients for waveform generation," arXiv:2009.00713, 2020.

Non-Patent Document 3: Z. Kong, W. Ping, J. Huang, K. Zhao, and B. Catanzaro, "DiffWave: A versatile diffusion model for audio synthesis," arXiv:2009.09761, 2020.

DISCLOSURE OF INVENTION

Technical Problem

However, when training processing is performed using data of a single speaker to obtain an optimized model (trained model), the quality of the audio synthesized waveform signals obtained by the optimized model (trained model) of WaveGrad or DiffWave is unfortunately worse than that of audio synthesized waveform signals obtained by an optimized model (trained model) of WaveGlow.

In view of the above problems, it is an object of the present invention to provide an audio synthesis processing device that achieves audio synthesis processing capable of obtaining high-quality audio (audio signals) while maintaining the speed of audio synthesis processing. In addition, it is another object of the present invention to provide a signal processing device that achieves signal generation processing capable of obtaining high-quality signals (for example, image signals) while maintaining processing speed for signals other than audio signals (for example, image signals).

Solution to Problem

To solve the above problems, a first aspect of the present invention provides a signal generation processing device that outputs an audio signal or an image signal from Gaussian white noise, including a first sub-model unit to an N-th sub-model unit, which are N (N is a natural number satisfying N≥2) sub-model units.

The first sub-model unit to the N-th sub-model unit each includes training models that each receive noise level data, a supervised signal for an audio signal or an image signal, and perform training processing so as to output Gaussian white noise from a noise synthesis signal that is a signal obtained by synthesizing the supervised signal and Gaussian white noise based on the noise level data.

The first sub-model unit to the N-th sub-model unit each perform training processing of the training models included in the first sub-model unit to the N-th sub-model unit using noise levels each included in different noise level ranges, thereby obtaining trained models.

In this signal generation processing device, the first sub-model unit to the N-th sub-model unit each perform training processing of the training models included in the first sub-model unit to the N-th sub-model unit using noise levels each included in different noise level ranges, thereby obtaining trained models.

In other words, in this signal generation processing device, training processing can be performed independently for each of the N sub-model units. That is, in each of the N sub-model units, training processing can be performed if the supervised signal, which is the correct data, the Gaussian white noise, and the noise level that determines the ratio of synthesizing them are known; therefore, training processing of N sub-model units can be performed in parallel. This allows this signal generation processing device to speed up the training processing.

A second aspect of the present invention provides a signal generation processing device that outputs an audio signal or an image signal corresponding to an input condition feature based on Gaussian white noise and the input condition feature, including a first sub-model unit to an N-th sub-model unit, which are N (N is a natural number satisfying N≥2) sub-model units.

The first sub-model unit to the N-th sub-model unit each includes training models that each receive noise level data, an input condition feature, and a supervised signal for an audio signal or image signal corresponding to the input condition feature, and perform training processing so as to output Gaussian white noise from a noise synthesis signal that is a signal obtained by synthesizing the supervised signal and Gaussian white noise based on the noise level data.

The first sub-model unit to the N-th sub-model unit each perform training processing of the training models included in the first sub-model unit to the N-th sub-model unit using noise levels each included in different noise level ranges, thereby obtaining trained models.

In this signal generation processing device, the first sub-model unit to the N-th sub-model unit each perform training processing of the training models included in the first sub-model unit to the N-th sub-model unit using noise levels each included in different noise level ranges, thereby obtaining trained models.

In other words, in this signal generation processing device, training processing can be performed independently for each of the N sub-model units. That is, in each of the N sub-model units, training processing can be performed if the supervised signal, which is the correct data, the input condition feature according thereto, the Gaussian white noise, and the noise level that determines the ratio of synthesizing them are known; therefore, training processing of N sub-model units can be performed in parallel. This allows this signal generation processing device to speed up the training processing.

A third aspect of the present invention provides the signal generation processing device of the second aspect, further including a control unit that sets a noise schedule.

The control unit selects a sub-model unit to be used, in performing signal generation processing, from the first sub-model unit to the N-th sub-model unit according to the noise level determined based on the noise schedule, and determines an order of processing of the sub-model units that have been selected.

The selected sub-model units perform prediction processing using the trained model in the order determined by the control unit to obtain an audio signal or an image signal according to the input condition feature.

This allows this signal generation processing device to select sub-model units to be used based on the noise level determined based on the noise schedule during signal generation processing (during prediction processing).

A fourth aspect of the present invention provides the signal generation processing device of the third aspect in which the first sub-model unit to the N-th sub-model unit have an order with respect to the ratio of the noise components of the input noise synthesis signal, and the order is an order in which the ratio of the noise component of the noise synthesis signal decreases, and the sub-model unit positioned ahead of the order has a faster processing speed than the sub-model unit positioned behind.

As a result, in this signal generation processing device, for example, when "the order with respect to the ratio of the noise components of the input noise synthesis signal" is an ascending order of the noise component of the input noise synthesis signal with respect to the indexes (1 to N) of the first to N-th sub-model units, (1) the signal generation processing device can set sub-model unit(s) located in front as sub-model unit(s) having a large ratio of the noise component of the noise synthesis signal to be inputted and having configuration(s) with high processing speed, and (2) the signal generation processing device can set sub-model unit(s) located behind as sub-model unit(s) having a low ratio of the noise component of the noise synthesis signal to be inputted and having configuration(s) with low processing speed.

Thus, in this signal generation processing device, for example, when the first sub-model unit to the N-th sub-model unit are arranged in descending order from the N-th sub-model unit to the first sub-model unit (in descending order with respect to indexes), and furthermore when the ratio of the noise components in the input noise synthesis signal decreases from the N-th sub-model unit to the first sub-model unit, a sub-model having a configuration with a high processing speed can be arranged on the preceding stage side. On the front-stage side, it is enough to output Gaussian white noise from a signal whose noise component is high, and the prediction processing is easily achieved; thus, sub-model unit(s) with a configuration whose processing speed is high are arranged on the front-stage side, thereby allowing for increasing the processing speed while maintaining the processing accuracy.

A fifth aspect of the present invention provides the signal generation processing device of the third aspect of the present invention in which the first sub-model unit to the N-th sub-model unit have an order with respect to the ratio of the noise components of the input noise synthesis signal, and the order is an order in which the ratio of the noise component of the noise synthesis signal decreases, and the sub-model unit positioned behind of the order has a higher processing accuracy than the sub-model unit positioned ahead. As a result, in this signal generation processing device, for example, when "the order with respect to the ratio of the noise components of the input noise synthesis signal" is an ascending order of the noise component of the input noise synthesis signal with respect to the indexes (1 to N) of the first to N-th sub-model units, (1) the signal generation processing device can set sub-model unit(s) located behind as sub-model unit(s) having a small ratio of the noise component of the noise synthesis signal to be inputted and having configuration(s) with high processing accuracy, and (2) the signal generation processing device can set sub-model unit(s) located in front as sub-model unit(s) having a high ratio of the noise component of the noise synthesis signal to be inputted and having configuration(s) with low processing accuracy.

Thus, in this signal generation processing device, for example, when the first sub-model unit to the N-th sub-model unit are arranged in descending order from the N-th sub-model unit to the first sub-model unit (in descending order with respect to indexes), and furthermore when the ratio of the noise components in the input noise synthesis signal decreases from the N-th sub-model unit to the first sub-model unit, a sub-model having a configuration with high processing accuracy can be arranged on the rear stage side. On the rear stage side, it is required to output Gaussian white noise from a signal whose noise component is low, and thus the prediction processing is difficult; arranging sub-model unit(s) with a configuration whose processing accuracy is high on the rear stage side allows for increasing the processing speed while maintaining the accuracy for the entire signal generation processing.

Note that an example for the configuration with high processing accuracy includes a configuration in which for example, the number of residual layers is large (or the neural network model is also large in model scale, the number of parameters is large, or the like), and the circuit scale is large, but the processing accuracy is high.

A sixth aspect of the present invention provides the signal generation processing device of one of the third to the fifth aspects of the present invention in which when the control unit selects sub-model units to be used, in performing signal generation processing, from the first sub-model unit to the N-th sub-model unit according to the noise level determined based on the noise schedule, the control unit sets the noise schedule so that the sub-model units to be used are distributed.

This makes it possible to prevent certain sub-model unit(s) from performing the processing intensively during the signal generation processing (during the prediction processing). In the signal generation processing device, if the processing accuracy of sub-model unit(s) with a large number of processing times is poor, the prediction accuracy of the sub-model unit(s) affects the entire processing accuracy; thus, distributing sub-model units to perform the processing prevents the processing accuracy from being greatly affected by the processing accuracy of certain sub-model unit(s), thereby improving the processing accuracy of the signal generation processing as a whole.

A seventh aspect of the present invention provides the signal generation processing device of the first or the second aspect of the present invention in which noise level ranges corresponding to the first sub-model unit to the N-th sub-model unit are determined based on the value obtained by taking the logarithm of the noise level, and the first sub-model unit to the N-th sub-model unit each perform the training processing using the noise level included in the noise level range corresponding to the sub-model unit to be processed.

This makes it easier to distribute the sub-model units that perform the processing during the prediction processing in this signal generation processing device.

Advantageous Effects

According to the present invention, it is possible to provide an audio synthesis processing device that achieves audio synthesis processing capable of obtaining high-quality audio (audio signal) while maintaining the speed of audio synthesis processing. Further, according to the present invention, it is possible to provide a signal processing device that achieves signal generation processing capable of obtaining high-quality signals (for example, image signals) while maintaining processing speed for signals other than audio signals (for example, image signals).

DESCRIPTION OF THE PREFERRED EMBODIMENTS

First Embodiment

A first embodiment will now be described with reference to the drawings.

1.1: Configuration of Audio Synthesis Processing Device

Figure 1:
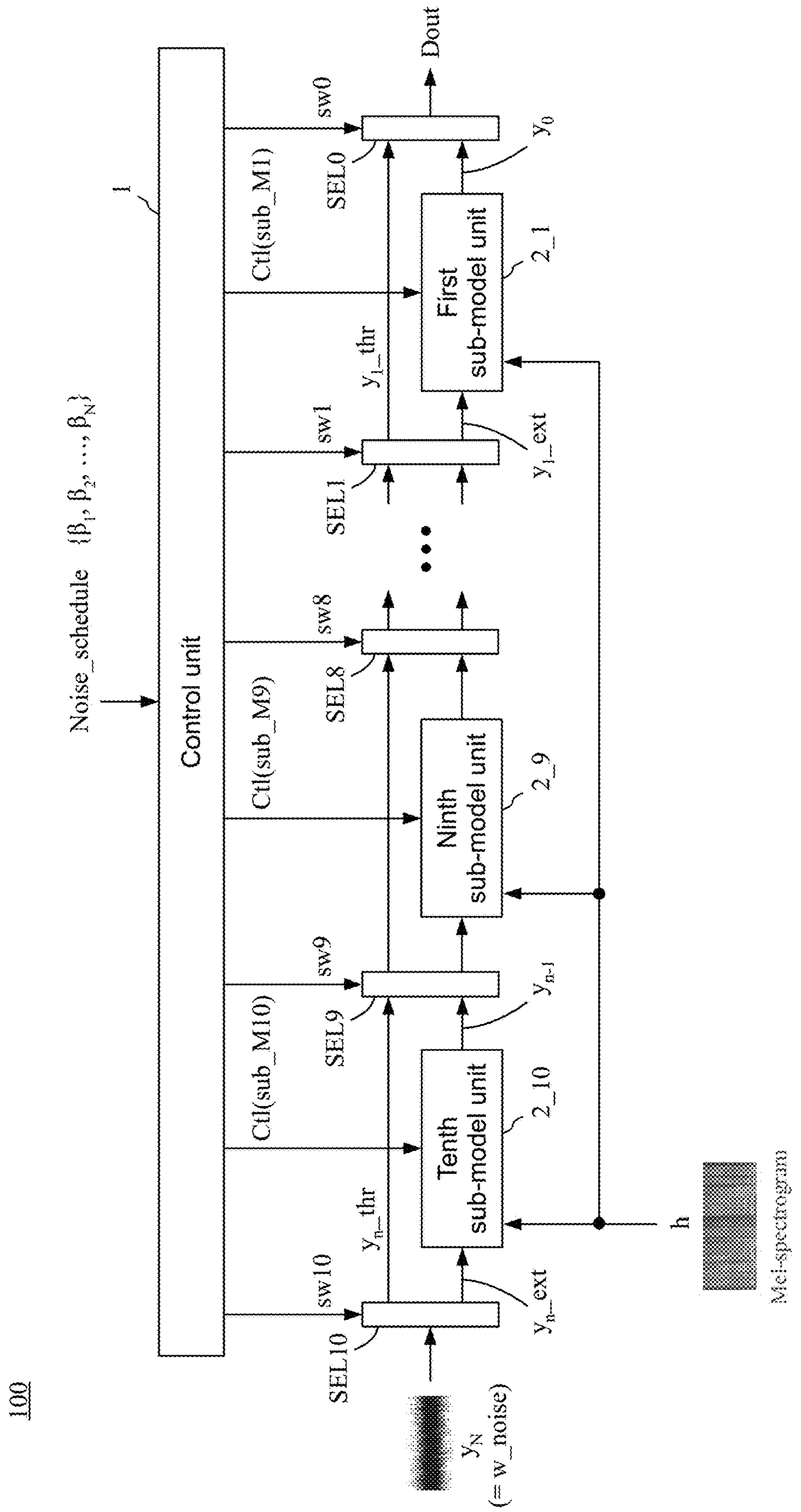
FIG. 1 is a schematic configuration diagram of an audio synthesis processing device 100 according to a first embodiment.

FIG. 1 is a schematic configuration diagram of an audio synthesis processing device 100 according to a first embodiment.

As shown in FIG. 1, the audio synthesis processing device 100 includes a control unit 1, N1 selectors (in FIG. 1, N1=10 and ten selectors SEL1 to SEL10 are shown), and N1 sub-model units (In FIGS. 1, N1=10 and 10 sub-model units, i.e., a first sub-model unit 2_1 to a tenth sub-model unit 2_10, are shown). In the following description, N1=10 is assumed for convenience of explanation, but N1 may be a natural number other than "10".

The control unit 1 receives data Noise_schedule ($=\{\beta_1, \beta_2, \ldots, \beta_N\}$, $\beta_i$ is a real number satisfying $0 \le \beta_i \le 1$ (i is an integer satisfying $1 \le i \le N$)), generates a control signal for controlling each sub-model unit and data necessary for each sub-model unit based on the data Noise_schedule, and transmits data containing the generated control signal and the generated data as control data to each sub-model unit. Note that the sub-model control data transmitted to the k-th sub-model unit 2_*k* (k is an integer satisfying 1≤k≤N1) is referred to as Ctl(sub_Mk).

The control unit 1 also generates selection signals for controlling the N1 selectors, and transmits the generated selection signals to the corresponding selectors.

The control unit 1 performs processing corresponding to the following from the noise schedule data Noise_schedule to obtain noise level data $\alpha_n$ and weighting noise level data $\alpha_n^{(w)}$.

Formula 1

$$\alpha_n = 1 - \beta_n \ (1 \le n \le N) \quad \alpha_n^{(w)} = \prod_{s=1}^{n} \alpha_s$$

When performing processing corresponding to the n-th noise schedule ($\beta_n$), the control unit 1 transmits a real number value (continuous value) between the weighting noise level data $\alpha_n^{(w)}$ and the noise level data $\alpha_{n-1}^{(w)}$, as weighting noise level data $\alpha^{(w)}$, to each sub-model unit.

Each of the N1 selectors selects an input and an output based on a selection signal transmitted from the control unit 1 to establish a predetermined path. The selector in the forefront of the N1 selectors (selector SEL10 in FIG. 1) is a selector with one input and two outputs (one input terminal and two output terminals), and the selector in the last stage (selector SEL0 in FIG. 1) is a selector with two inputs and one output (two input terminals and one output terminal). Other selectors are selectors each having two inputs and two outputs (two input terminals and two output terminals).

As shown in FIG. 1, the N1 selectors are arranged such that a path having one sub-model unit and a through path are secured between two adjacent selectors.

Each of the N1 sub-model units (the first sub-model unit 2_1 to the tenth sub-model unit 2_10 in FIG. 1) has the same configuration. Here, the configuration of the k-th sub-model unit (k is a natural number satisfying 1≤k≤N1) will be described.

Figure 2:
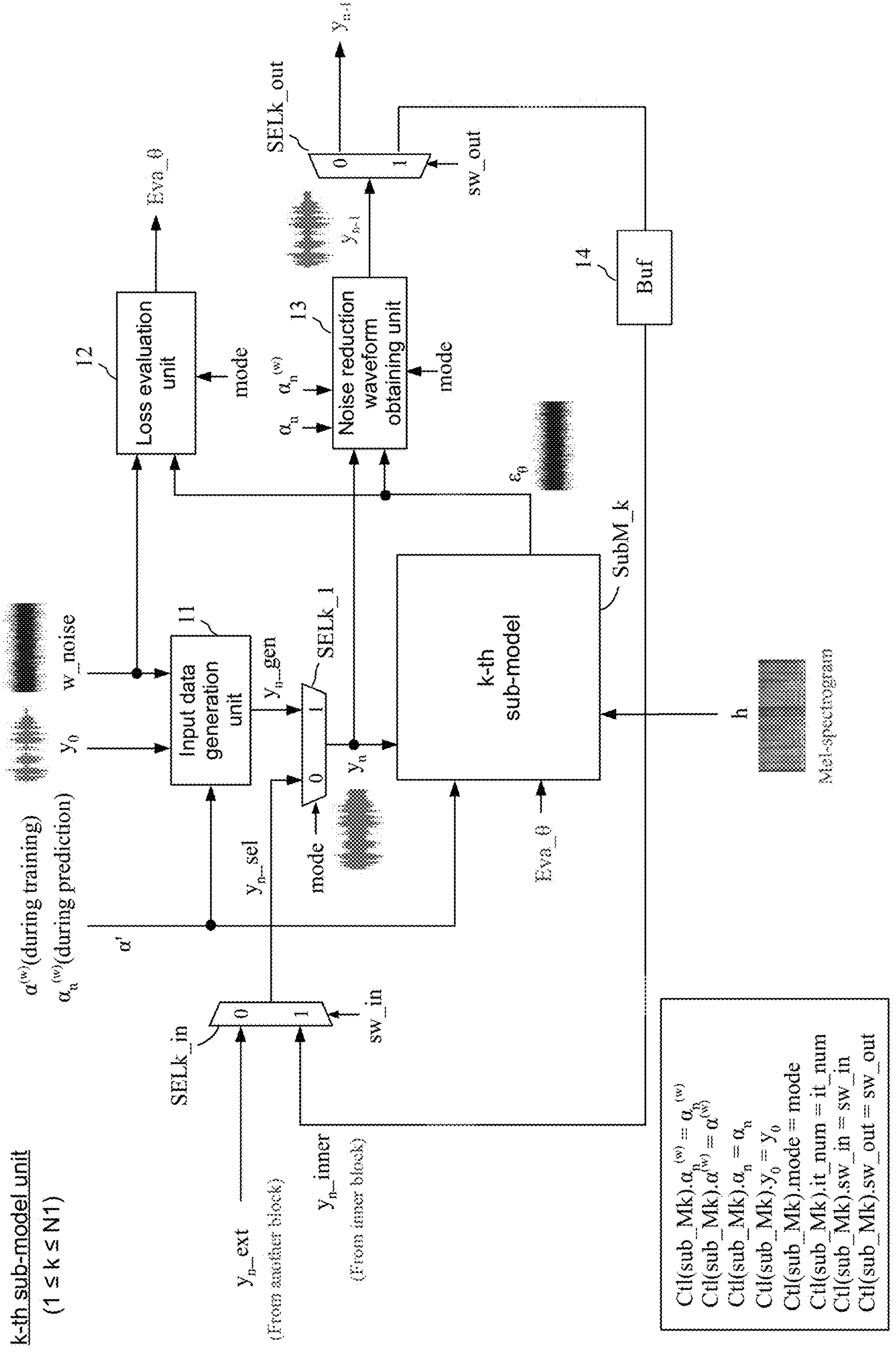
FIG. 2 is a schematic configuration diagram of a k-th sub-model unit of the audio synthesis processing device 100 according to the first embodiment.

As shown in FIG. 2, the k-th sub-model unit includes an input selector SELk_in, an input data generation unit 11, a selector SEL_k1, a k-th sub-model SubM_k (k is a natural number satisfying 1≤k≤N1), a loss evaluation unit 12, a noise reduction waveform obtaining unit 13, an output selector SELk_out, and a buffer 14.

The input selector SELk_in receives a signal (this is referred to as a signal $y_n$_ext) transmitted from the selector arranged in the preceding stage of the k-th sub-model unit (a signal transmitted from a terminal for the k-th sub-model unit) and a signal transmitted from the buffer 14 (this is referred to as a signal $y_n$_inner), selects one of the two inputs based on a selection signal sw_in, and then transmits the selected signal as signal $y_n$_sel to selector SEL_k1. It is assumed that the selection signal sw_in is included in the sub-model control data Ctl(sub_Mk) transmitted from the control unit 1 to the k-th sub-model unit. Also, the selection signal sw_in included in the sub-model control data Ctl (sub_Mk) is referred to as "Ctl(sub_Mk).sw_in".

The input data generation unit 11 is a functional unit that operates in a training mode (mode for performing training processing), and receives audio waveform data $y_0$ (correct data), Gaussian white noise w_noise, and weighting noise level data α' (during training: $\alpha'=\alpha^{(w)}$, during prediction: $\alpha'=\alpha_n^{(w)}$). The input data generation unit 11 synthesizes the audio waveform data $y_0$ and the Gaussian white noise w_noise based on the weighting noise level data $\alpha_n^{(w)}$, and transmits the synthesized data as audio noise synthesis data yn_gen to the selector SEL_k1. Note that the weighting noise level data α' (during training: $\alpha'=\alpha^{(w)}$, during prediction: $a'=\alpha_n^{(w)}$) is assumed to be included in the sub-model control data Ctl(sub_Mk) transmitted from the control unit to the k-th sub-model unit. Also, the weighting noise level data $\alpha_n^{(w)}$ during prediction included in the sub-model control data Ctl(sub_Mk) is expressed as "Ctl(sub_Mk).$\alpha_n^{(w)}$". Also, the weighting noise level data $\alpha^{(w)}$ during training included in the sub-model control data Ctl(sub_Mk) is expressed as "Ctl(sub_Mk).$\alpha^{(w)}$".

The selector SEL_k1 receives an output from the input selector SELk_in, an output from the input data generation unit 11, and a mode signal mode transmitted from the control unit 1. When the mode signal mode is the "training mode", the selector SEL_k1 selects the terminal "1", selects the output from the input data generation unit 11, and transmits it as the signal $y_n$ to the k-th sub-model SubM_k. Conversely, when the mode signal mode is the "prediction mode", the selector SEL_k1 selects the terminal "0", selects the output from the input selector SELk_in, and transmits it as the signal $y_n$ to the k-th sub-model SubM_k.

The k-th submodel SubM_k receives the signal $y_n$ transmitted from the selector SEL_k1, noise level data α' (during training: $\alpha'=\alpha^{(w)}$, during prediction: $\alpha'=\alpha_n^{(w)}$), and an acoustic feature h. Also, the k-th sub-model SubM_k receives the loss evaluation data Eva_θ transmitted from the loss evaluation unit 12 when training processing is performed (when in the training mode). The k-th submodel SubM_k is, for example, a model provided by using a neural vocoder, and performs training processing so as to output Gaussian white noise from the signal $y_n$, the noise level data α', and the acoustic feature h, which are inputted thereinto in the training processing. In other words, the k-th sub-model SubM_k receives the signal $y_n$, the noise level data α', and the acoustic feature h as inputs, and outputs the output signal $\varepsilon_\theta$ to the loss evaluation unit 12. In accordance with Eva_θ which is data obtained by evaluating the loss of the output signal $\varepsilon_\eta$ and the Gaussian white noise w_noise by the loss evaluation unit 12, the k-th sub-model SubM_k updates parameters, and performs training processing such that the difference between the output signal $\varepsilon_\theta$ and the Gaussian white noise w_noise is within a predetermined range.

The k-th sub-model SubM_k constructs a model, in which the parameters (optimization parameters) obtained by the training processing have been set, as a trained model; during prediction (during audio synthesis processing), the k-th sub-model SubM_k performs prediction processing using the trained model. During prediction, the k-th sub-model SubM_k receives the signal $y_n$, the noise level data α', and the acoustic feature h, and outputs the output signal $\varepsilon_\theta$ to the noise reduction waveform obtaining unit 13.

A: When Adopting the DiffWave Model

The k-th sub-model SubM_k can be provided by using, for example, the architecture disclosed in Non-Patent Document 3 (this is referred to as "DiffWave model").

Figure 3:
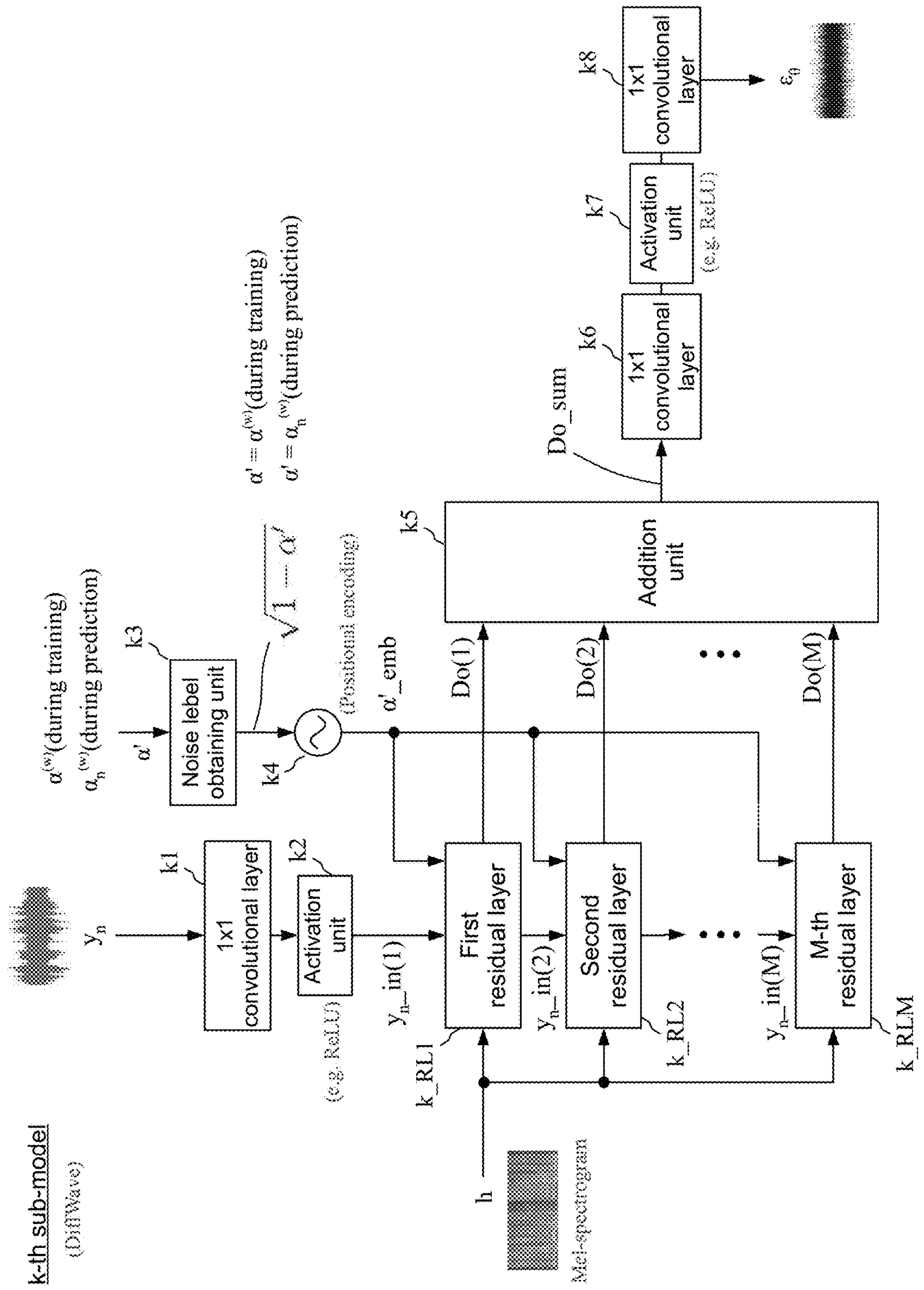
FIG. 3 is a schematic configuration diagram of the k-th sub-model unit (DiffWave model) according to the first embodiment.

When the k-th sub-model SubM_k is provided by using a DiffWave model, as shown in FIG. 3, the k-th sub-model SubM_k includes a 1×1 convolutional layer k1, an activation unit k2, a noise level obtaining unit k3, a positional encoder k4, a first residual layer k_RL1 to an M-th residual layer k_RLM, which are M (M is a natural number) residual layers, an addition unit k5, a 1×1 convolutional layer k6, an activation unit k7, and a 1×1 convolutional layer k8.

The 1×1 convolutional layer k1 receives the signal $y_n$ transmitted from the selector SEL_k1, performs convolution processing on the signal $y_n$ using a 1×1 kernel, and then transmits the signal after convolution processing to the activation unit k2.

The activation unit k2 receives the output from the 1×1 convolutional layer k1, performs activation processing (for example, processing by an activation function (ReLU function, or the like)) on the input, and then transmits a signal after the activation processing to the first residual layer k_RL1 as signal $y_n$_in(1).

The noise level obtaining unit k3 receives the weighting noise level data α' as input, performs noise level conversion processing on the weighting noise level data α' to obtain a converted noise level sqrt(1−α')(sqrt(x): the square root of x). The noise level obtaining unit k3 then transmits the obtained converted noise level sqrt(1−α') to the positional encoder k4.

The positional encoder k4 receives the converted noise level sqrt(1−α') transmitted from the noise level obtaining unit k3, performs positional encoding processing on the converted noise level sqrt(1−α') to obtain embedding representation data α'_emb including positional information. The positional encoder k4 then transmits the obtained embedding representation data α'_emb to the first residual layer k_RL1 to the M-th residual layer k_RLM.

The first residual layer k_RL1 to the M-th residual layer k_RLM, which are M (M is a natural number) residual layers, each have the same configuration. Here, the configuration of the first residual layer k_RL1 will be described.

Figure 4:
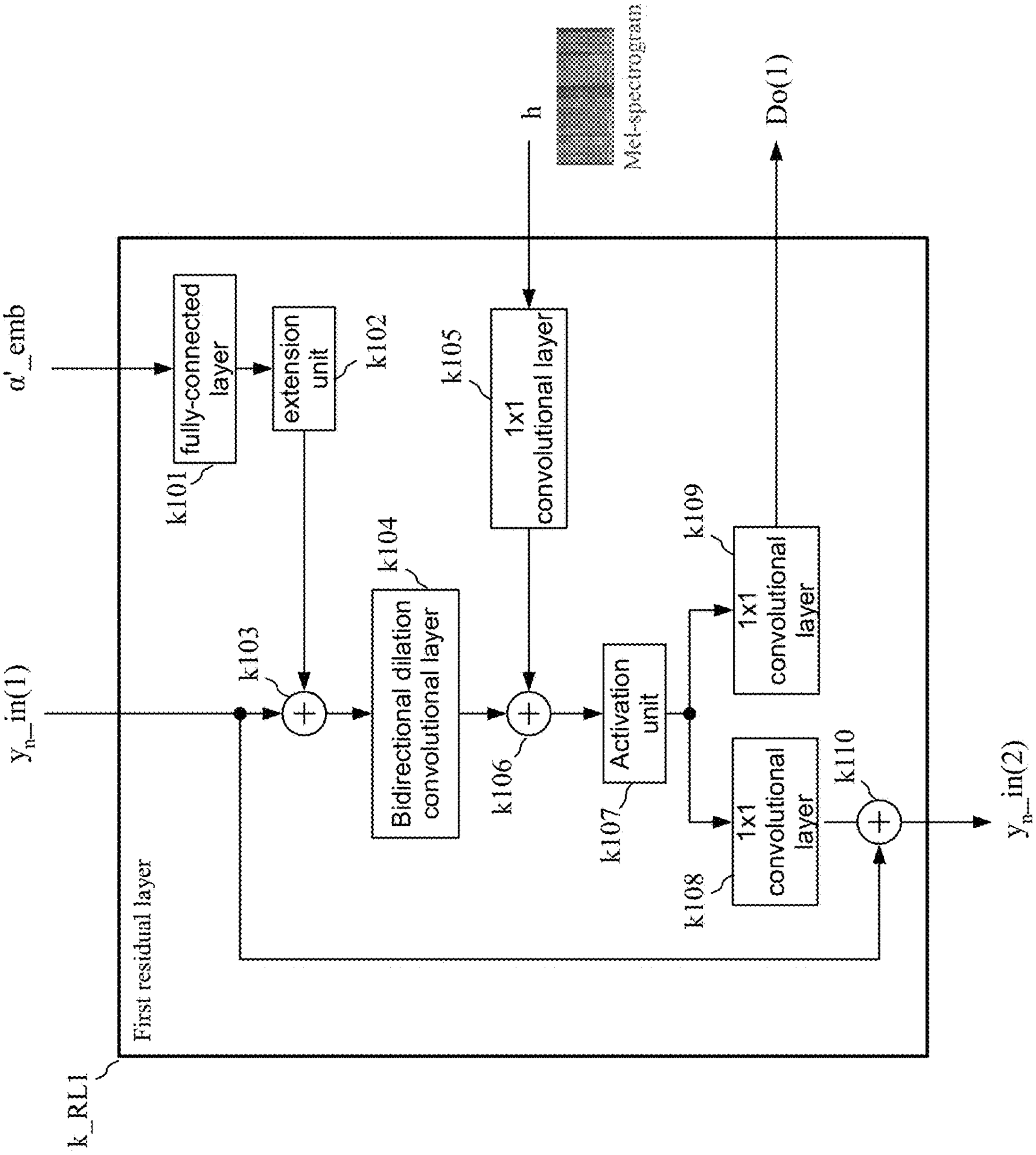
FIG. 4 is a schematic configuration diagram of a first residual layer k_RL1 of the k-th sub-model unit (DiffWave model) according to the first embodiment.

As shown in FIG. 4, the first residual layer k_RL1 includes a fully-connected layer k101, an extension unit k102, an addition unit k103, a bidirectional dilation convolutional layer k104, a 1×1 convolutional layer k105, an addition unit k106, an activation unit k107, a 1×1 convolutional layer k108, a 1×1 convolutional layer k109, and an addition unit k110.

The fully-connected layer k101 receives the embedding representation data α'_emb transmitted from the positional encoder k4, and performs fully-connected layer processing on the embedding representation data α'_emb. The signal after processing of the fully-connected layer is transmitted to the extension unit k102.

The extension unit k102 performs extension processing on the output from the fully-connected layer k101 so that the addition processing can be performed with the signal $y_n$_in (1), which is the input of the first residual layer, in the addition unit k103. For example, when the signal $y_n$_in(1) is a vector, the signal transmitted from the fully-connected layer k101 is extended (for example, by copying) so as to match the dimension of the vector with the dimension of the signal $y_n$_in(1). The extension unit k102 then transmits the data after the extension processing to the addition unit k103.

The addition unit k103 adds the signal $y_n$_in(1) (output from the activation unit k2), which is the input of the first residual layer, and the output from the extension unit k102. The addition unit k103 then transmits the signal after addition processing to the bidirectional dilation convolutional layer k104.

The bidirectional dilation convolutional layer k104 receives the signal transmitted from the addition unit k103, performs bidirectional dilated convolution processing on the signal, and then transmits the processed signal to the addition unit k106.

The 1×1 convolutional layer k105 receives the acoustic feature h as an input, performs convolution processing on the acoustic feature h using a 1×1 kernel, and then transmits the processed signal to the addition unit k106.

The addition unit k106 receives the output from the bidirectional dilation convolutional layer k104 and the output from the 1×1 convolutional layer k105, and performs addition processing of adding the output from the bidirectional dilation convolutional layer k104 with the output from the 1×1 convolutional layer k105. The addition unit k106 then transmits the signal after addition processing to the activation unit k107.

The activation unit k107 receives the output from the addition unit k106, performs activation processing (for example, processing by using an activation function (ReLU function, or the like)) on the input, and then transmits a signal after the activation processing to 1×1 convolutional layers k108 and k109.

The 1×1 convolutional layer k108 receives the output from the activation unit k107, performs convolution processing on the input using a 1×1 kernel, and then transmits the processed signal to the addition unit k110.

The 1×1 convolutional layer k109 receives the output from the activation unit k107 as an input, performs convolution processing with a 1×1 kernel on the input, and then transmits the signal after the processing as the signal Do(1) to the addition unit k5.

The addition unit k110 performs addition processing of adding the signal $y_n$_in(1) (output from the activation unit k2), which is the input of the first residual layer, with the output from the 1×1 convolutional layer k108, and then transmits a signal after the addition processing to the second residual layer as a signal $y_n$_in(2). In other words, the output of the first residual layer k_KL1 is the input (signal $y_n$_in(2)) of the second residual layer k_KL2.

The second residual layer k_RL2 to the M-th residual layer k_RLM also have the same configuration as the first residual layer k_RL1.

The addition unit k5 receives signals Do(1) to Do(M) transmitted from the first residual layer k_RL1 to the M-th residual layer k_RLM, respectively, performs addition processing of adding the signals Do(1) to Do(M), and then transmits the signal after the addition processing to the 1×1 convolutional layer k6 as a signal Do_sum.

The 1×1 convolutional layer k6 receives the signal Do_sum transmitted from the addition unit k5, performs convolution processing on the input using a 1×1 kernel, and then transmits the processed signal to the activation unit k7.

The activation unit k7 receives the output from the 1×1 convolutional layer k6, performs activation processing (for example, processing by using an activation function (ReLU function, or the like)) on the input, and then transmits a signal after the activation processing to the 1×1 convolutional layer k8.

The 1×1 convolutional layer k8 receives the output from the activation unit k7 as an input, performs convolution processing with a 1×1 kernel on the input, and then transmits a signal after the processing as the signal $\varepsilon_\theta$ to the loss evaluation unit 12 and the noise reduction waveform obtaining unit 13.

The loss evaluation unit 12 is a functional unit that operates in the training processing mode, and receives the Gaussian white noise w_noise and the signal $\varepsilon_\theta$ transmitted from the k-th sub-model SubM_k. The loss evaluation unit 12 evaluates the loss (for example, error) between the Gaussian white noise w_noise and the signal $\varepsilon_\theta$, obtains parameters (updated parameters) of the k-th sub-model for making the Gaussian white noise w_noise and the signal $\varepsilon_\theta$ approach each other, and then transmits data including the parameters (updated parameters) to the k-th sub-model as loss evaluation data Eva_θ. The k-th sub-model performs parameter update processing based on the loss evaluation data Eva_θ transmitted from the loss evaluation unit 12 during training processing. When the loss between the Gaussian white noise w_noise and the signal $\varepsilon_\theta$ falls within a predetermined range, or when a change in the loss between the Gaussian white noise w_noise and the signal $\varepsilon_\theta$ falls within a predetermined range even after parameter update processing is performed, the loss evaluation unit 12 determines that the training processing has converged and then terminates the training processing. In the k-th sub-model, a trained model is obtained by setting the parameters obtained when the training processing has been completed to those of the k-th sub-model.

The noise reduction waveform obtaining unit 13 is a functional unit that operates in the prediction processing mode, and receives the signal $y_n$ transmitted from the selector SEL_k1, the signal $\varepsilon_\theta$ transmitted from the k-th sub-model SubM_k, and the noise level data $\alpha_n$ and the weighting noise level data $\alpha_n^{(w)}$ transmitted from the control unit 1. The noise reduction waveform obtaining unit 13 performs noise reduction processing using the signal $y_n$ and the signal $\varepsilon_\theta$ based on the noise level data $\alpha_n$ and the weighting noise level data $\alpha_n^{(w)}$, and transmits a signal after the processing to the output selector SELk_out as signal $y_{n-1}$.

The output selector SELk_out receives the output from the noise reduction waveform obtaining unit 13 and selects the output in accordance with the selection signal sw_out included in the sub-model control data Ctl(sub_Mk) transmitted from the control unit 1. When the value of the selection signal sw_out is "0", the input signal $y_{n-1}$ is transmitted to the selector arranged after the k-th sub-model. When the value of the selection signal sw_out is "1", the input signal $y_{n-1}$ is transmitted to the buffer 14.

The buffer 14 receives the output from the output selector SELk_out, and stores and holds the input. Further, the buffer 14 transmits the stored signal as a signal $y_n$_inner to the input selector SELk_in.

B: When Adopting the WaveGrad Model

The k-th sub-model SubM_k can also be provided by using, for example, the architecture disclosed in Non-Patent Document 2 (this is referred to as "WaveGrad model").

Figure 5:
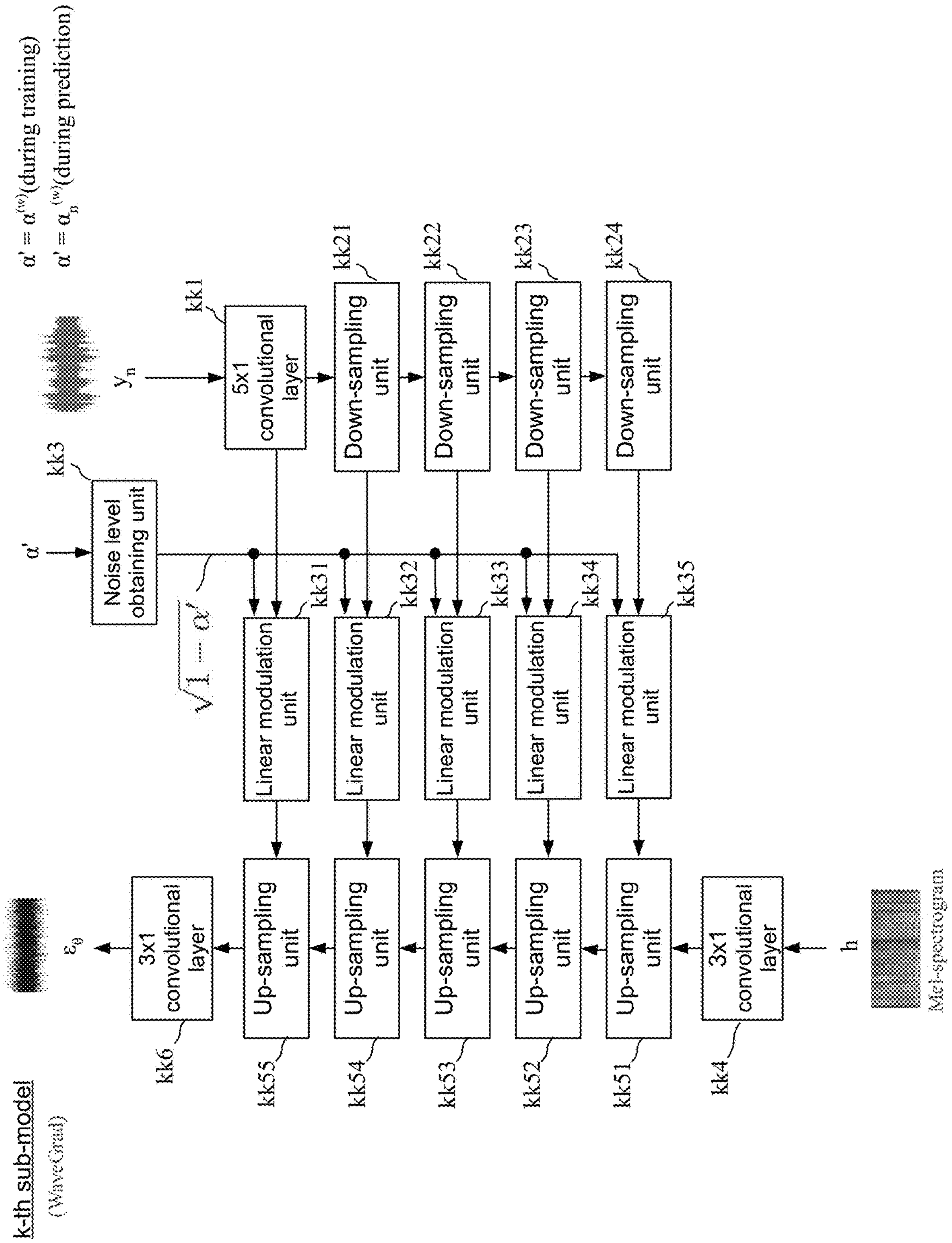
FIG. 5 is a schematic configuration diagram of a k-th sub-model unit (WaveGrad model) according to the first embodiment.

When the k-th sub-model SubM_k is provided by using the WaveGrad model, as shown in FIG. 5, the k-th sub-model SubM_k includes a 5×1 convolutional layer kk1, four down-sampling units kk21 to kk24, a noise level obtaining unit kk3, five linear modulation units kk31 to kk35, a 3×1 convolutional layer kk4, five up-sampling units kk51 to kk55, and a 3×1 convolutional layer kk6.

The 5×1 convolutional layer kk1 receives the signal $y_n$ transmitted from the selector SEL_k1, performs convolution processing on the signal $y_n$ using a 5×1 kernel, and then transmits the signal after the convolution processing to the down-sampling unit kk21.

Figure 6:
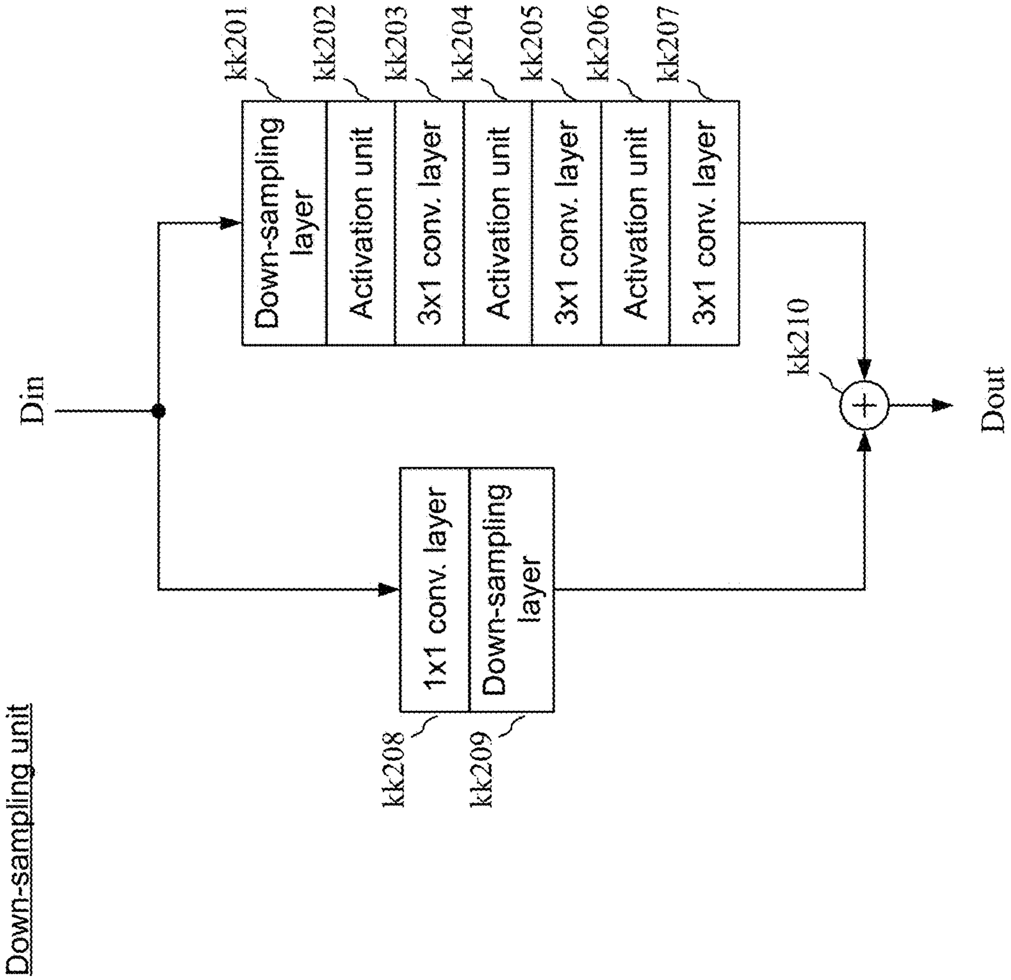
FIG. 6 is a schematic configuration diagram of a down-sampling unit of the k-th sub-model unit (WaveGrad model) according to the first embodiment.

The four down-sampling units kk21 to kk24 have the same configuration. As shown in FIG. 6, the four down-sampling units kk21 to kk24 each includes a down-sampling layer kk201, an activation unit kk202, a 3×1 convolutional layer kk203, an activation unit kk204, a 3×1 convolutional layer kk205, an activation unit kk206, a 3×1 convolutional layer kk207, a 1×1 convolutional layer kk208, a down-sampling layer kk209, and an addition unit k210.

The down-sampling layer kk201 performs down-sampling processing on the input Din, and transmits the processed signal to the activation unit kk202.

Each of the activation units kk202, k204, and k206 performs activation processing (for example, processing by using an activation function (ReLU function or the like)) on the input, and then transmits the signal after the activation processing to the functional unit located on the rear side.

Each of the 3×1 convolutional layers kk203, kk205, and kk207 performs convolution processing on the input using a 3×1 kernel, and transmits a signal after the convolution processing to the functional unit located on the rear side. Note that the output of the 3×1 convolutional layer kk207 is transmitted to the addition unit k210.

The 1×1 convolutional layer kk208 performs convolution processing using a 1×1 kernel on the input Din, and transmits a signal after the convolution processing to the down-sampling layer kk209.

The down-sampling layer kk209 performs down-sampling processing on the output from the 1×1 convolutional layer kk208 and transmits a processed signal to the addition unit kk210.

The addition unit k210 performs processing of adding the output of the 3×1 convolutional layer kk207 and the output of the down-sampling layer kk209, and transmits a processed signal as the signal Dout. In other words, the signal Dout is transmitted to the rear-side down-sampling unit.

The noise level obtaining unit k3 receives the weighting noise level data α' as input, performs noise level conversion processing on the weighting noise level data α' to obtain a converted noise level sqrt(1−α')(sqrt(x): the square root of x). The noise level obtaining unit k3 then transmits the obtained converted noise level sqrt(1−α') to each of the five linear modulation units kk31 to kk35.

Figure 7:
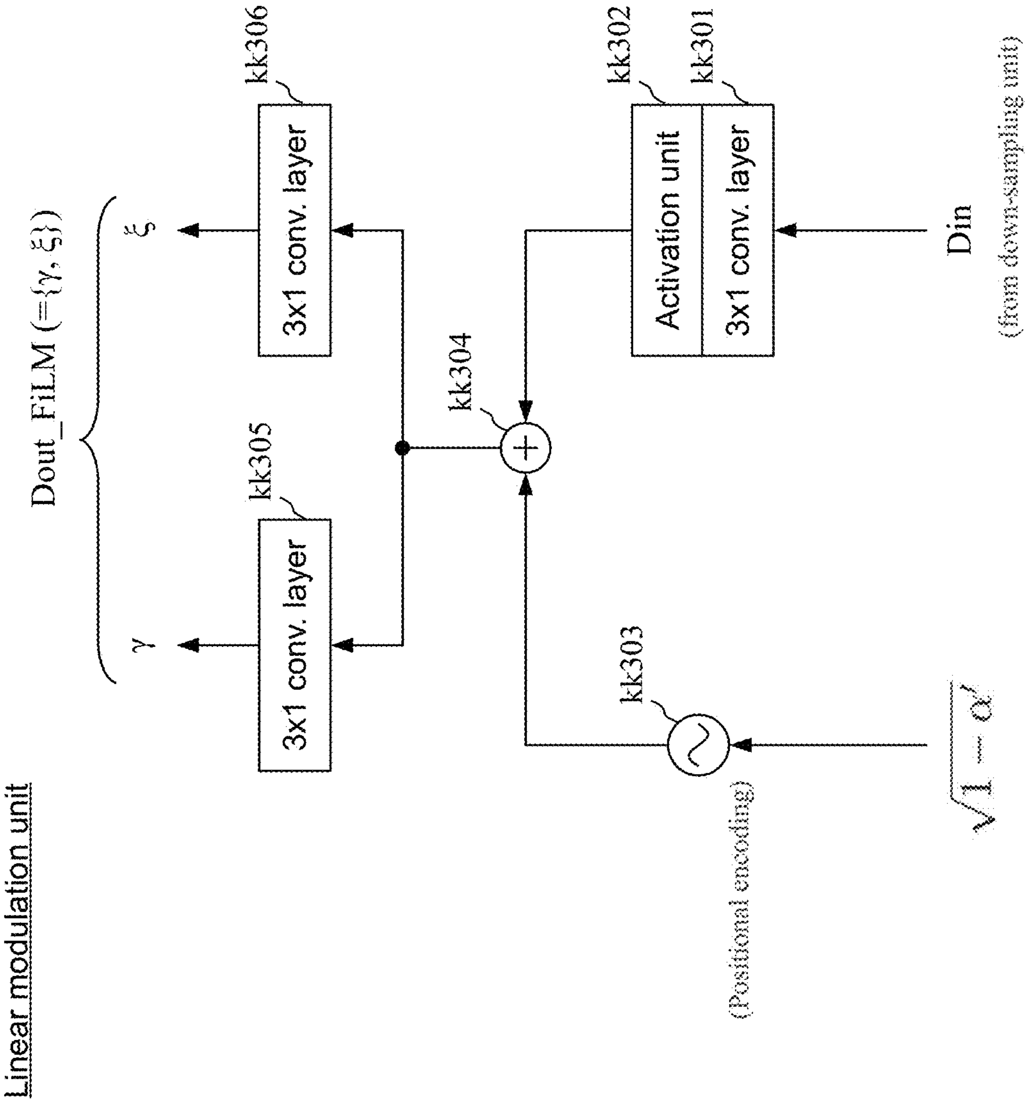
FIG. 7 is a schematic configuration diagram of a linear modulation unit of the k-th sub-model unit (WaveGrad model) according to the first embodiment.

The five linear modulation units kk31 to kk35 have the same configuration. As shown in FIG. 7, each of the five linear modulation units kk31 to kk35 includes a 3×1 convolutional layer kk301, an activation unit kk302, a positional encoder kk303, an addition unit kk304, a 3×1 convolutional layer kk305, a 3×1 convolutional layer kk305, and a 3×1 convolutional layer kk306.

The 3×1 convolutional layer kk301 performs convolution processing using a 3×1 kernel on the input Din (input from the down-sampling unit to the linear modulation unit), and transmits a signal after the convolution processing to the activation unit kk302.

The activation unit kk302 performs activation processing (for example, processing by using an activation function (ReLU function, or the like)) on the input, and transmits a signal after the activation processing to the addition unit kk304.

The positional encoder kk303 receives the converted noise level sqrt(1−α') transmitted from the noise level obtaining unit kk3, performs positional encoding on the converted noise level sqrt(1−α') to obtain embedding representation data α'_emb including positional information. The positional encoder kk303 then transmits the obtained embedding representation data α'_emb to the addition unit kk304.

The addition unit kk304 adds the output from the positional encoder kk303 and the output from the activation unit kk302, and transmits a processed signal to the 3×1 convolutional layers kk305 and kk306.

The 3×1 convolutional layer kk305 performs convolution processing using a 3×1 kernel on the output from the addition unit kk304 to obtain data after the convolution processing as data γ.

The 3×1 convolutional layer kk306 performs convolution processing using a 3×1 kernel on the output from the addition unit kk304 to obtain data after the convolution processing as data ξ.

The linear modulation unit then transmits data including the data γ and ξ obtained as described above to the up-sampling unit as output data Dout_FiLM (={γ, ξ}).

The 3×1 convolutional layer kk4 receives the acoustic feature h as an input, performs convolution processing using a 3×1 kernel on the input, and then transmits a signal after the convolution processing to the up-sampling unit kk51.

Figure 8:
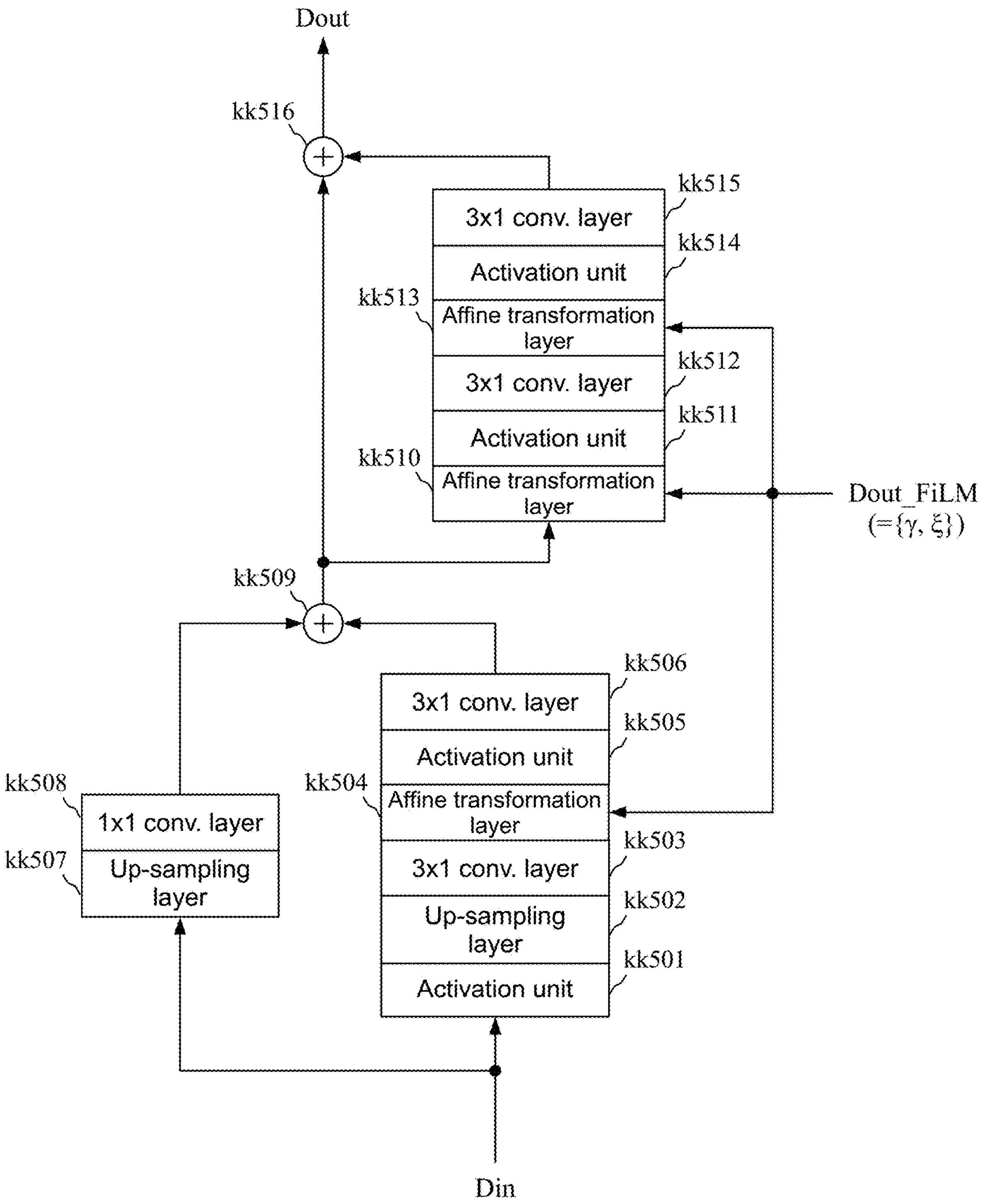
FIG. 8 is a schematic configuration diagram of an up-sampling unit of the k-th sub-model unit (WaveGrad model) according to the first embodiment.

As shown in FIG. 8, the five up-sampling units kk51 to kk55 includes a 3×1 convolutional layer kk506, an up-sampling layer kk507, a 1×1 convolutional layer kk508, an addition unit kk509, an affine transformation layer kk510, an activation unit kk511, a 3×1 convolutional layer kk512, an affine transformation layer kk513, an activation unit kk 514, a 3×1 convolutional layer kk 515 and an addition unit 516.

The activation unit kk501 performs activation processing (for example, processing by using an activation function (ReLU function, or the like)) on the input into the up-sampling unit (input Din in FIG. 8), and transmits a signal after the activation processing to up-sampling layer kk 502.

The up-sampling layer kk501 performs up-sampling processing on the output from the activation unit kk501 and transmits a processed signal to the 3×1 convolutional layer kk503.

The 3×1 convolutional layer kk503 performs convolution processing using a 3×1 kernel on the output from the up-sampling layer kk502, and transmits a signal after the convolution processing to the affine transformation layer kk504.

The affine transformation layer kk504 receives the output from the 3×1 convolutional layer kk503 and Dout_FiLM (={γ, ξ}) transmitted from the linear modulation unit. Assuming that the output from the 3×1 convolutional layer kk503 is Di, the affine transformation layer kk504 performs processing corresponding to the following formula to obtain data Do.

$$Do = \text{HadamardDot}(\gamma, Di) + \xi$$

HadamardDot(x, y): a function that takes the Hadamard product of x and y

The affine transformation layer kk504 then transmits the obtained data Do to the activation unit kk505.

The activation unit kk505 performs activation processing (for example, processing by using an activation function (ReLU function, or the like)) on the output from the affine transformation layer kk504, and transmits a signal after the activation processing into the 3×1 convolutional layer kk506.

The 3×1 convolutional layer kk506 performs convolution processing using a 3×1 kernel on the output from the activation unit kk505, and transmits a signal after the convolution processing to the addition unit kk509.

The up-sampling layer kk507 performs up-sampling processing on the input into the up-sampling unit (input Din in FIG. 8) and transmits a processed signal to the 1×1 convolutional layer kk508.

The 1×1 convolutional layer kk508 performs convolution processing using a 1×1 kernel on the output from the up-sampling layer kk507, and transmits a signal after the convolution processing to the addition unit kk509.

The addition unit kk509 performs processing of adding the output from the 3×1 convolutional layer kk506 and the output from the 1×1 convolutional layer kk508, and transmits a signal after addition processing to the addition unit kk516 and the affine transformation layer kk510.

The affine transformation layer kk510 receives the output from the addition unit kk509 and Dout_FiLM (={γ, ξ}) transmitted from the linear modulator. Assuming that the output from the addition unit kk509 is Di, the affine transformation layer kk510 performs processing according to the following formula to obtain data Do.

$$Do = \text{HadamardDot}(\gamma, Di) + \xi$$

HadamardDot(x, y): a function that takes the Hadamard product of x and y

The affine transformation layer kk510 then transmits the obtained data Do to the activation unit kk511.

The activation unit kk511 performs activation processing (for example, processing by using an activation function (ReLU function, or the like)) on the output from the affine transformation layer kk510, and transmits a signal after the activation processing to the 3×1 convolutional layer 512.

The 3×1 convolutional layer kk512 performs convolution processing using a 3×1 kernel on the output from the activation unit kk511, and transmits a signal after the convolution processing to the affine transformation layer kk513.

The affine transformation layer kk513 receives the output from the 3×1 convolutional layer kk512 and Dout_FiLM (={γ, ξ}) transmitted from the linear modulation unit. Assuming that the output from the 3×1 convolutional layer kk512 is Di, the affine transformation layer kk513 performs processing according to the following formula to obtain data Do.

$$Do = \text{HadamardDot}(\gamma, Di) + \xi$$

HadamardDot(x, y): a function that takes the Hadamard product of x and y

The affine transformation layer kk513 then transmits the obtained data Do to the activation unit kk514.

The activation unit kk514 performs activation processing (for example, processing by using an activation function (ReLU function, or the like)) on the output from the affine transformation layer kk513, and transmits a signal after the activation processing to the 3×1 convolutional layer kk515.

The 3×1 convolutional layer kk515 performs convolution processing using a 3×1 kernel on the output from the activation unit kk514, and transmits a signal after the convolution processing to the addition unit kk516.

The addition unit 516 performs processing of adding the output from the addition unit kk509 and the output from the 3×1 convolutional layer kk515, and transmits a signal after the addition processing as the signal Dout to the next-stage functional unit.

The 3×1 convolutional layer kk6 performs convolution processing using a 3×1 kernel on the output of the up-sampling unit kk55, which is the final up-sampling unit, and transmits a signal after the convolution processing to the loss evaluation unit 12 and the noise reduction waveform obtaining unit 13 as the signal $\varepsilon_\theta$.

In this way, the WaveGrad model can be adopted as the k-th sub-model SubM_k.

1.2: Operation of Audio Synthesis Processing Device

The operation of the audio synthesis processing device 100 configured as above will be described below.

For the operation of the audio synthesis processing device 100, (1) training processing (processing during training) and (2) prediction processing (processing during prediction) will now be described separately. For convenience of explanation, a case where the number of sub-model units (sub-models) is "10" (N1=10) will be described.

1.2.1: Training Processing

First, training processing by the audio synthesis processing device 100 will be described.

The audio synthesis processing device 100 can independently performs training processing for each sub-model unit (sub-model). In other words, a sub-model to be associated with each noise level is determined, and the determined sub-models are trained for their corresponding noise levels, thereby obtaining a trained model of each sub-model.

For example, the audio synthesis processing device 100 determines a sub-model to be associated with each noise level as follows. In the following, a case will be described in which the sub-model to be subjected to training processing is determined according to the converted noise level sqrt(1−α').

(1) When 0≤sqrt(1−α')<0.1 is satisfied.

Training processing is performed using the first sub-model unit 2_1 (first sub-model SubM_1).

(2) When 0.1≤sqrt(1−α')<0.2 is satisfied.

Training processing is performed using the second sub-model unit 2_2 (second sub-model SubM_2).

(3) When 0.2≤sqrt(1−α')<0.3 is satisfied.

Training processing is performed using the third sub-model unit 2_3 (third sub-model SubM_3).

(4) When 0.3≤sqrt(1−α')<0.4 is satisfied.

Training processing is performed using the fourth sub-model unit 2_4 (fourth sub-model SubM_4).

(5) When 0.4≤sqrt(1−α')<0.5 is satisfied.

Training processing is performed using the fifth sub-model unit 2_5 (fifth sub-model SubM_5).

(6) When 0.5≤sqrt(1−α')<0.6 is satisfied.

Training processing is performed using the sixth sub-model unit 2_6 (sixth sub-model SubM_6).

(7) When 0.6≤sqrt(1−α')<0.7 is satisfied.

Training processing is performed using the seventh sub-model unit 2_7 (seventh sub-model SubM_7).

(8) When 0.7≤sqrt(1−α')<0.8 is satisfied.

Training processing is performed using the eighth sub-model unit 2_8 (eighth sub-model SubM_8).

(9) When 0.8≤sqrt(1−α')<0.9 is satisfied.

Training processing is performed using the ninth sub-model unit 2_9 (the ninth sub-model SubM_9).

(10) When 0.9≤sqrt(1−α')<1.0 is satisfied.

Training processing is performed using the tenth sub-model unit 2_10 (tenth sub-model SubM_10).

Specific training processing for the first sub-model unit 2_1 will be described below.

The control unit 1 transmits α' that satisfies 0≤sqrt(1−α')<0.1 (during training: $\alpha'=\alpha^{(w)}$) to the first sub-model unit 2_1.

Also, the control unit 1 sets the mode signal mode to a value indicating the training processing mode, and transmits it to the first sub-model unit 2_1. The control unit 1 also transmits the audio waveform signal $y_0$ (correct data) to the first sub-model unit 2_1.

Figure 9:
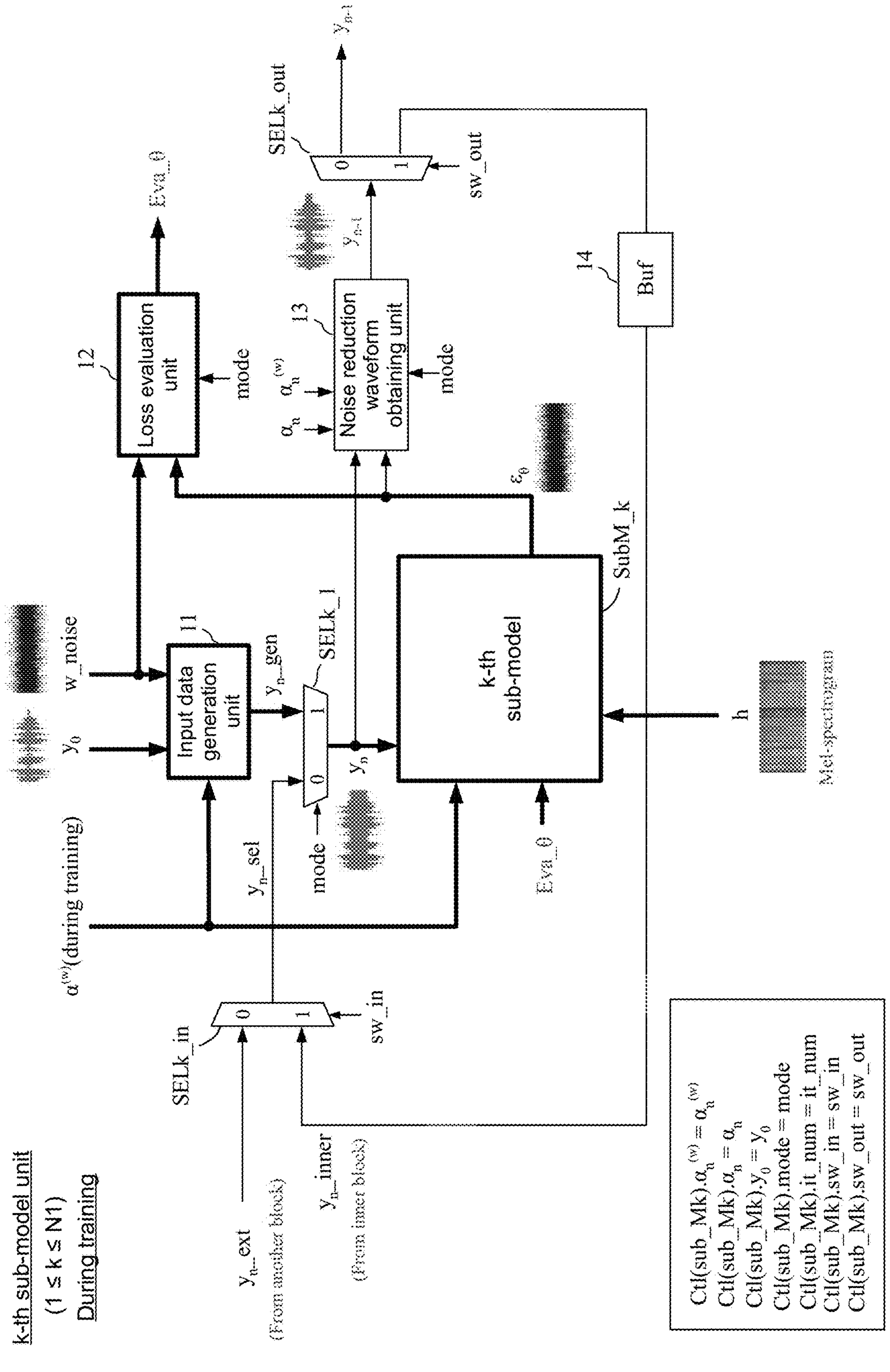
FIG. 9 is a schematic configuration diagram of the k-th sub-model unit of the audio synthesis processing device 100 according to the first embodiment (when training processing is performed).

As shown in FIG. 9, the input data generation unit 11 of the first sub-model unit 2_1 receives the audio waveform signal $y_0$ (correct data), the Gaussian white noise w_noise, and the weighting noise level α', and performs processing according to the following formula to obtain a signal yn_gen.

$$y_n\_gen=\alpha'\times y_0+\mathrm{sqrt}(1-\alpha')\times w\_noise$$

The input data generation unit 11 then transmits the obtained signal $y_n$_gen to the selector SEL_k1. The selector SEL_k1 selects the terminal "1" in accordance with the mode signal mode, and transmits the signal $y_n$_gen as the signal $y_n$ to the k-th sub-model (k=1). Also, the acoustic feature h is inputted into the k-th sub-model (k=1).

In the k-th sub-model (k=1), the processing is performed by the functional unit shown in FIG. 3, and the signal $\varepsilon_\theta$ is obtained. The signal $\varepsilon_\theta$ obtained by the k-th sub-model (k=1) is transmitted to the loss evaluation unit 12.

In the training processing mode, the loss evaluation unit 12 evaluates a loss (for example, error) between the Gaussian white noise w_noise and the signal $\varepsilon_\theta$ using a loss function defined by the following formula, for example.

$$\mathrm{Loss}=E_{\epsilon,c}[\|\epsilon-\epsilon_\theta(\sqrt{\alpha^{(w)}}y_0+\sqrt{1-\alpha^{(w)}}\epsilon,\ h,c)\|_2^2] \quad \text{Formula 2}$$

When the DiffWave model is adopted as the sub-model, c=n is satisfied; when the WaveGrad model is adopted as the sub-model, $c=\mathrm{sqrt}(\alpha^{(w)})$ is satisfied.

Based on the value of the loss function, the loss evaluation unit 12 obtains parameters (updated parameters) of the k-th sub-model for bringing the Gaussian white noise w_noise closer to the signal $\varepsilon_\theta$, and then transmits data including the parameters (updated parameters) to the k-th sub-model as loss evaluation data Eva_θ.

The k-th sub-model performs parameter update processing based on the loss evaluation data Eva_θ transmitted from the loss evaluation unit 12. When the loss between the Gaussian white noise w_noise and the signal $\varepsilon_\theta$ falls within a predetermined range, or when a change in the loss between the Gaussian white noise w_noise and the signal $\varepsilon_\theta$ falls within a predetermined range even after parameter update processing is performed, the loss evaluation unit 12 determines that the training processing has converged and then terminates the training processing. In the k-th sub-model, a trained model is obtained by setting the parameters obtained when the training processing has been completed to those of the k-th sub-model.

As described above, the training processing for the first sub-model unit 2_1 is performed.

For each of the second sub-model unit 2_2 to the tenth sub-model unit 2_10, the training processing is performed while continuously changing the noise level in the corresponding noise level range, thereby allowing for obtaining a trained model in the corresponding noise level range.

In this manner, the audio synthesis processing device 100 can perform training processing independently for each of N1 (ten) sub-model units. In other words, when in each of the N1 (ten) sub-models, the audio waveform signal $y_0$ as the correct data, the corresponding acoustic feature h, the Gaussian white noise w_noise, and the noise level determining the ratio of synthesizing them are known, the training processing can be performed, thus allowing the training processing of N1 (ten) sub-model units to be performed in parallel. This allows the audio synthesis processing device 100 to speed up the training processing.

In the above description, the case where the DiffWave model is adopted as the sub-model has been described, but the WaveGrad model may be adopted as the sub-model.

When the WaveGrad model is adopted as the sub-model, the function unit shown in FIG. 5 performs processing in the k-th sub-model to obtain the signal $\varepsilon_\theta$. The signal $\varepsilon_\theta$ obtained by the k-th sub-model (k=1) is then transmitted to the loss evaluation unit 12.

Further, in the audio synthesis processing device 100, all N1 (ten) sub-model units may be provided by using the same model (for example, all may be provided by using the DiffWave model, or all may be provided by using the WaveGrad model); alternatively, different models may be mixed to provide N1 (ten) sub-model units.

For example, the WaveGrad model, which has a fast processing speed but slightly inferior audio quality, may be adopted as sub-model unit(s) in the early stage(s) of the audio synthesis processing device 100, and the DiffWave model, which has a slow processing speed but high audio quality, may be adopted as sub-model unit(s) in the last stage(s) of the audio synthesis processing device 100. In the audio synthesis processing device 100, when prediction (audio synthesis) is performed, a signal whose noise is gradually reduced is outputted from the initial sub-model unit (the tenth sub-model unit in FIG. 1) to the following sub-model unit; finally, an audio signal (a signal in which the noise component is most reduced) is outputted from the last sub-model unit (the first sub-model unit in FIG. 1). In other words, for the sub-model units in the early stages, it is sufficient to output a signal obtained by slightly reducing the noise component from the Gaussian white noise w_noise, and therefore the prediction process is relatively simple, whereas the sub-model units in the last stages need to output a signal in which the noise component is considerably reduced from the noise w_noise, and therefore it is difficult to perform prediction. Thus, in the audio synthesis processing device 100, high-speed but low-quality sub-models are arranged in the early stages, and low-speed but high-quality sub-models are arranged in the stages closer to the end, thereby allowing for enhancing the quality of the audio signal(s) obtained (predicted) by the audio synthesis processing device 100.

1.2.2: Prediction Processing (Audio Synthesis Processing)

Next, prediction processing (audio synthesis processing) by the audio synthesis processing device 100 will be described.

For convenience of explanation, a case where the noise schedule ($=\{\beta_1, \beta_2, \ldots, \beta_N\}$, N=6) is determined so that the converted noise level sqrt(1−α') corresponds to the points (black diamond dots) of the polygonal line Pt1 shown in FIG. 10 will be described.

Figure 10:
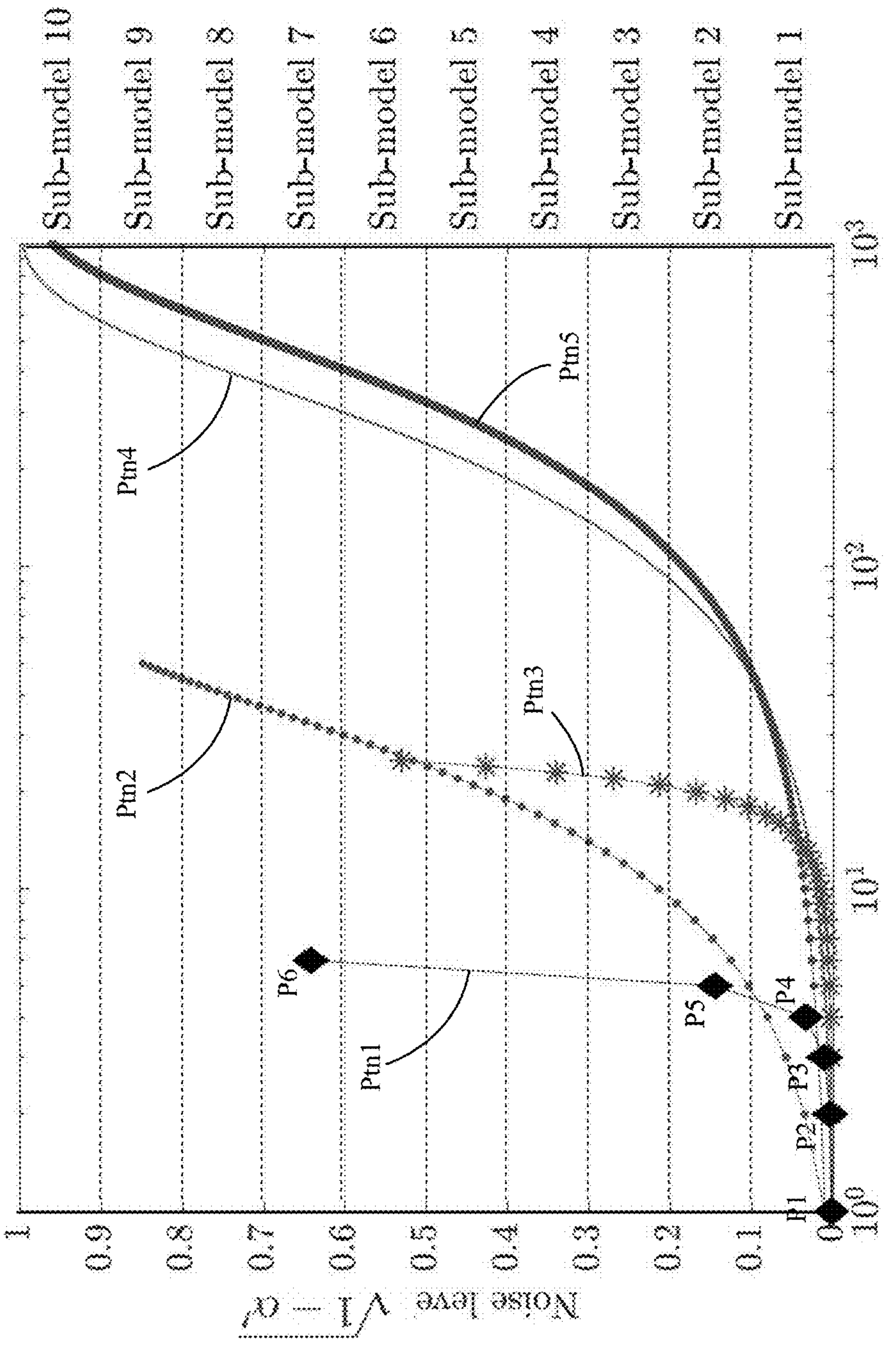
FIG. 10 is a graph showing the relationship between index n indicating the order of processing and converted noise level sqrt(1−α').

FIG. 10 is a graph showing the relationship between the index n indicating the order of processing and the converted noise level sqrt(1−α'). In FIG. 10, sub-models shown on the right end of the graph are sub-models applied within the range of the converted noise level sqrt(1−α').

When the noise schedule ($=\{\beta_1, \beta_2, \ldots, \beta_N\}$, N=6) is determined so that the converted noise level sqrt(1−α') corresponds to the points (black diamond dots)(the points P6 to P1) of the polygonal line Pt1 shown in FIG. 10, prediction processing (audio synthesis processing) is performed in the order of the seventh sub-model unit 2_7 (the number of repetitions: 1), the second sub-model unit 2_2 (the number of repetitions: 1), and the first sub-model unit 2_1 (the number of repetitions: 4).

The control unit 1 determines sub-model units to be used in accordance with the determined noise schedule ($=\{\beta_1, \beta_2, \ldots, \beta_N\}$, N=6). Specifically, the sub-model units to be used are determined as follows.

(1) The converted noise level sqrt(1−α') (=sqrt($1-\alpha_n^{(w)}$), n=6) corresponding to the point P6 (corresponding to $\beta_6$) in FIG. 10 is 0.6≤sqrt($1-\alpha_n^{(w)}$)<0.7; thus, the first sub-model unit used when n=N=6 is the seventh sub-model unit 2_7.

(2) The converted noise level sqrt(1−α') (=sqrt($1-\alpha_n^{(w)}$), n=5) corresponding to the point P5 (corresponding to $\beta_5$) in FIG. 10 is 0.1≤sqrt($1-\alpha_n^{(w)}$)<0.2; thus, the sub-model unit used when n=5 is the second sub-model unit 2_2.

(3) The converted noise level sqrt(1−α') (=sqrt($1-\alpha_n^{(w)}$), n=4) corresponding to the point P4 (corresponding to $\beta_4$) in FIG. 10 is 0≤sqrt($1-\alpha_n^{(w)}$)<0.1; thus, the sub-model unit used when n=4 is the first sub-model unit 2_1.

(4) The converted noise level sqrt(1−α') (=sqrt($1-\alpha_n^{(w)}$), n=3) corresponding to the point P3 (corresponding to $\beta_3$) in FIG. 10 is 0≤sqrt($1-\alpha_n^{(w)}$)<0.1; thus, the sub-model unit used when n=3 is the first sub-model unit 2_1.

(5) The converted noise level sqrt(1−α') (=sqrt($1-\alpha_n^{(w)}$), n=2) corresponding to the point P2 (corresponding to $\beta_2$) in FIG. 10 is 0≤sqrt($1-\alpha_n^{(w)}$)<0.1; thus, the sub-model unit used when n=2 is the first sub-model unit 2_1.

(6) The converted noise level sqrt(1−α') (=sqrt($1-\alpha_n^{(w)}$), n=1) corresponding to the point P1 (corresponding to $\beta_1$) in FIG. 10 is 0≤sqrt($1-\alpha_n^{(w)}$)<0.1; thus, the sub-model unit used when n=1 is the first sub-model unit 2_1.

Figure 11:
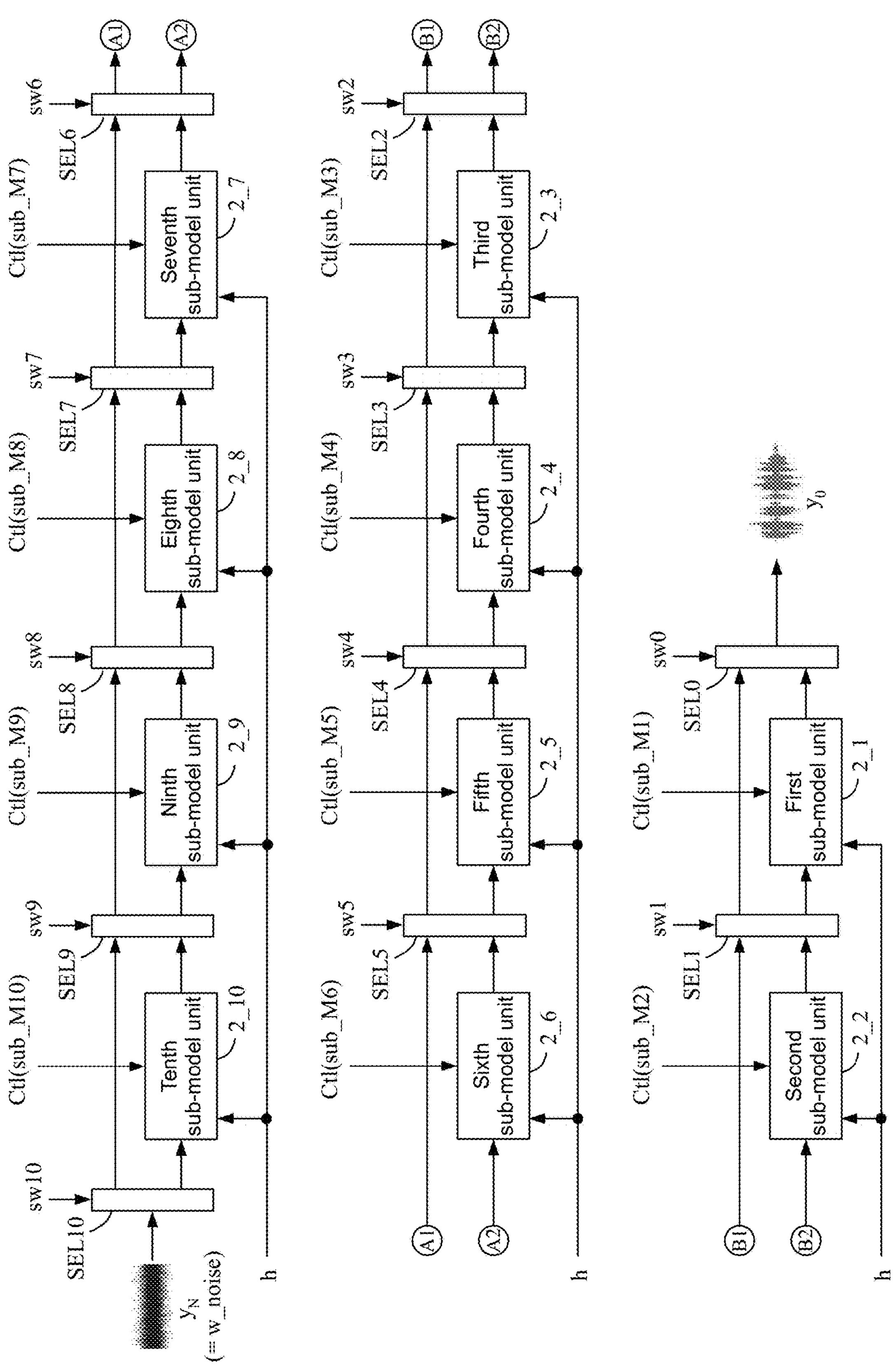
FIG. 11 is a diagram extracting and showing selectors and the k-th sub-model unit of the audio synthesis processing device 100.

FIG. 11 is a diagram extracting and showing the selector and the k-th sub-model unit of the audio synthesis processing device 100.

Figure 12:
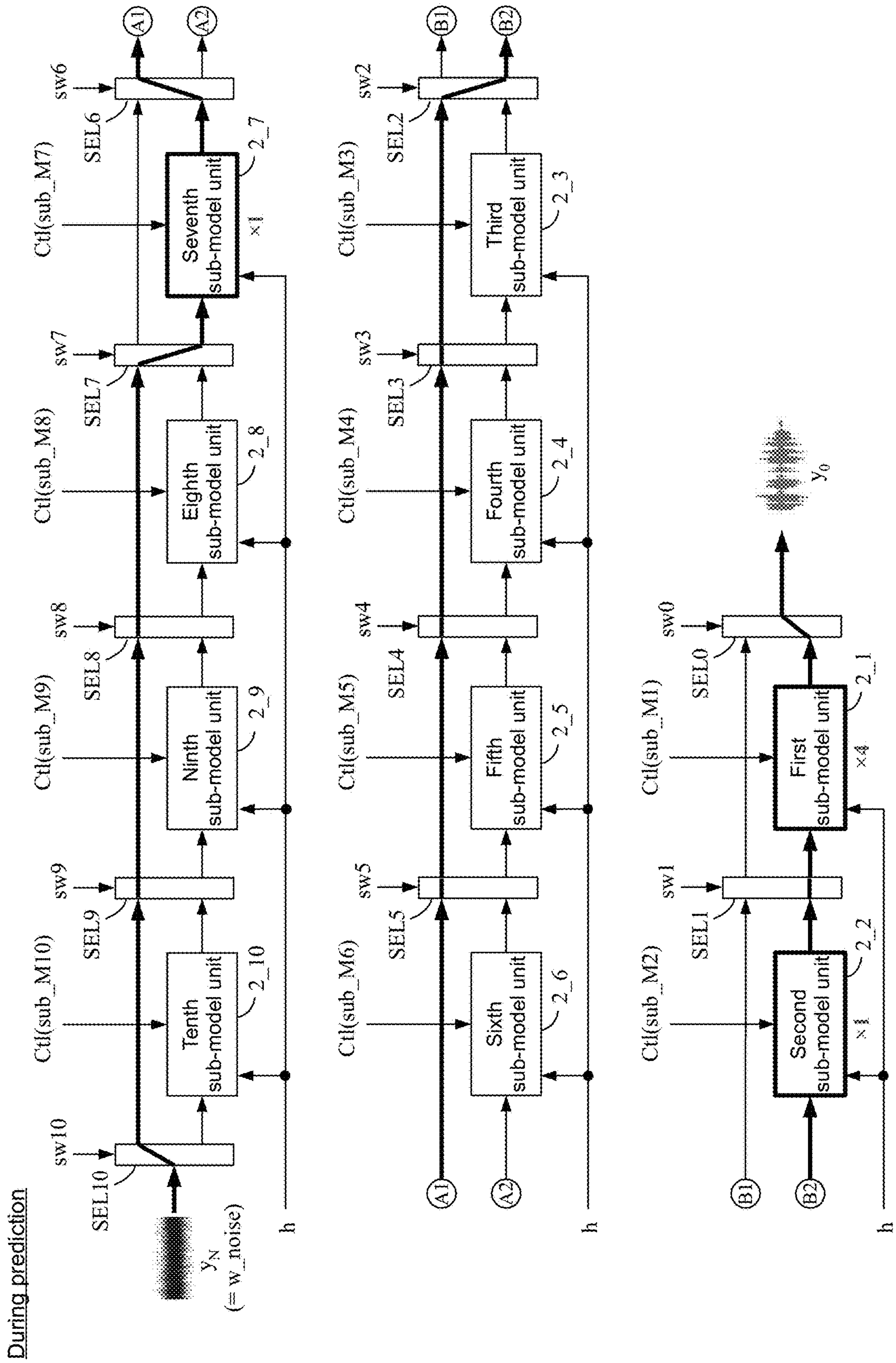
FIG. 12 is a diagram extracting and showing selectors and the k-th sub-model unit of the audio synthesis processing device 100.

FIG. 12 is a diagram extracting the selector and the k-th sub-model unit of the audio synthesis processing device 100, and is a diagram clearly showing the sub-model units used by the noise schedule.

When the sub-model units to be used are determined as described above, the control unit 1 controls the selectors SEL10, SEL9, and SEL8 so as to be switched to select the through path, as shown in FIG. 12; furthermore the control unit 1 controls the selector 7 so as to be switched to select the path to the sub-model unit 2_7. As a result, the Gaussian white noise w_noise (=$y_N$, N=6) inputted into the selector SEL10 is inputted into the seventh sub-model unit 2_7.

The control unit 1 also outputs sub-model control data Ctl(sub_M7) to the seventh sub-model unit 2_7.

Figure 13:
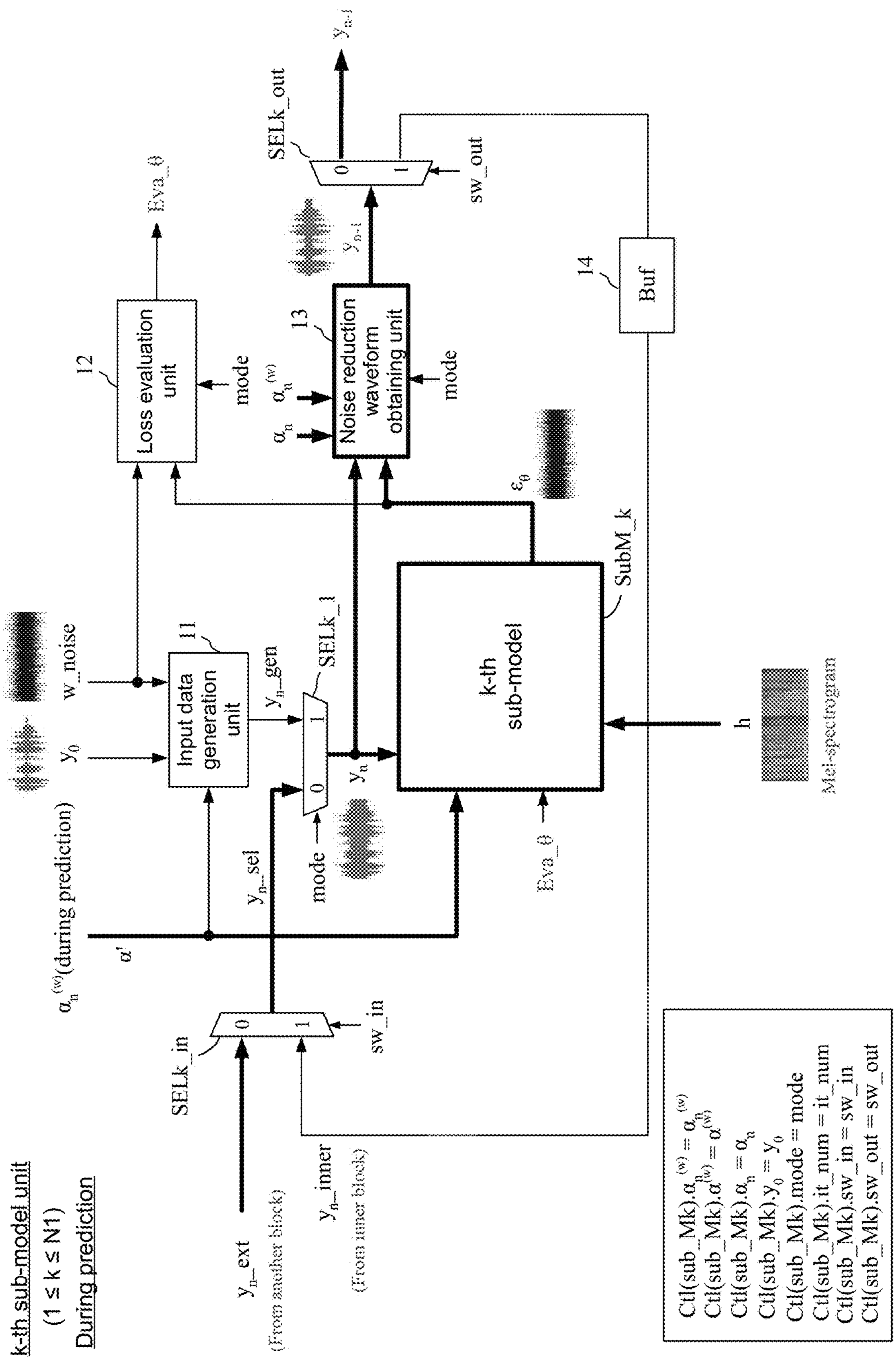
FIG. 13 is a schematic configuration diagram of the k-th sub-model unit of the audio synthesis processing device 100 according to the first embodiment (when prediction processing is performed).

FIG. 13 is a schematic configuration diagram of the k-th sub-model unit during prediction processing.

In the seventh sub-model unit 2_7, the signal $y_n$_ext shown in FIG. 13 is the signal $y_N$ (=w_noise). The control unit 1 selects the terminal "0" of the input selector SELk_in, and further selects the terminal "0" of the selector SELk_1, thereby inputting the signal $y_N$ (=w_noise) into the k-th sub-model (k=7). Also, the acoustic feature h is inputted into the k-th sub-model (k=7). Also, the control unit 1 inputs $\alpha_n^{(w)}$ (n=6) (the value $\alpha_n^{(w)}$ (n=6) calculated from the noise schedule $\beta_6$) into the k-th sub-model (k=7).

The k-th sub-model SubM_k (k=7) performs processing (processing with the trained model) by the function unit shown in FIG. 3 to obtain the signal $\varepsilon_\theta$. The signal Co obtained by the k-th sub-model SubM_k (k=7) is transmitted to the noise reduction waveform obtaining unit 13.

The noise reduction waveform obtaining unit 13 receives the signal $y_n$ ($y_N$ (=w_noise)) transmitted from the selector SEL_k1, the signal $\varepsilon_\theta$ transmitted from the k-th sub-model SubM_k (k=7), and the noise level data αn and weighting noise level data $\alpha_n^{(w)}$ transmitted from the control unit 1. The noise reduction waveform obtaining unit 13 performs noise reduction processing using the signal $y_n$ and the signal Co based on the noise level data an and the weighting noise level data $\alpha_n^{(w)}$. Specifically, the noise reduction waveform obtaining unit 13 performs processing according to the following formula to obtain a signal $y_{n-1}$ (n=6) after noise reduction processing.

Formula 3

$$y_{n-1} = \frac{1}{\sqrt{\alpha_n}}\left(y_n - \frac{1-\alpha_n}{\sqrt{1-\alpha_n^{(w)}}}\epsilon_\theta(y_n, h, c)\right) + \sigma_n z$$

$$\sigma_n = \sqrt{\frac{\beta_n\left(1-\alpha_{n-1}^{(w)}\right)}{\left(1-\alpha_n^{(w)}\right)}}$$

$$z \sim N(0, I)(\text{when } n > 0)(I \text{ is the identity matrix})$$

The noise reduction waveform obtaining unit 13 then transmits the signal $y_{n-1}$ obtained as described above to the output selector SELk_out. The control unit 1 selects the terminal "0" of the output selector SELk_out and outputs the signal $y_{n-1}$ to the selector SEL6.

The control unit 1 performs switch control in the selector SEL6 so that the output from the seventh sub-model unit (signal $y_{n-1}$, n=6) is outputted to the through path side. Further, as shown in FIG. 12, the control unit 1 performs switch control so that the through path is selected in the selectors SEL5, SEL4, and SEL3.

The control unit 1 then performs switch control so that the path to the second sub-model unit 2_2 is selected in the selector SEL2.

The second sub-model unit 2_2 sets an input signal to the signal $y_5$ and sets n as n=5, and then performs the same processing as the processing performed in the seventh sub-model unit 2_7. As a result, the signal $y_{n-1}$ (=$y_4$) is obtained in the second sub-model unit 2_2, and the signal $y_{n-1}$ (=$y_4$) is outputted to the selector SEL1.

The control unit 1 performs switch control so that the path to the first sub-model unit 2_1 is selected in the selector SEL1.

Figure 14:
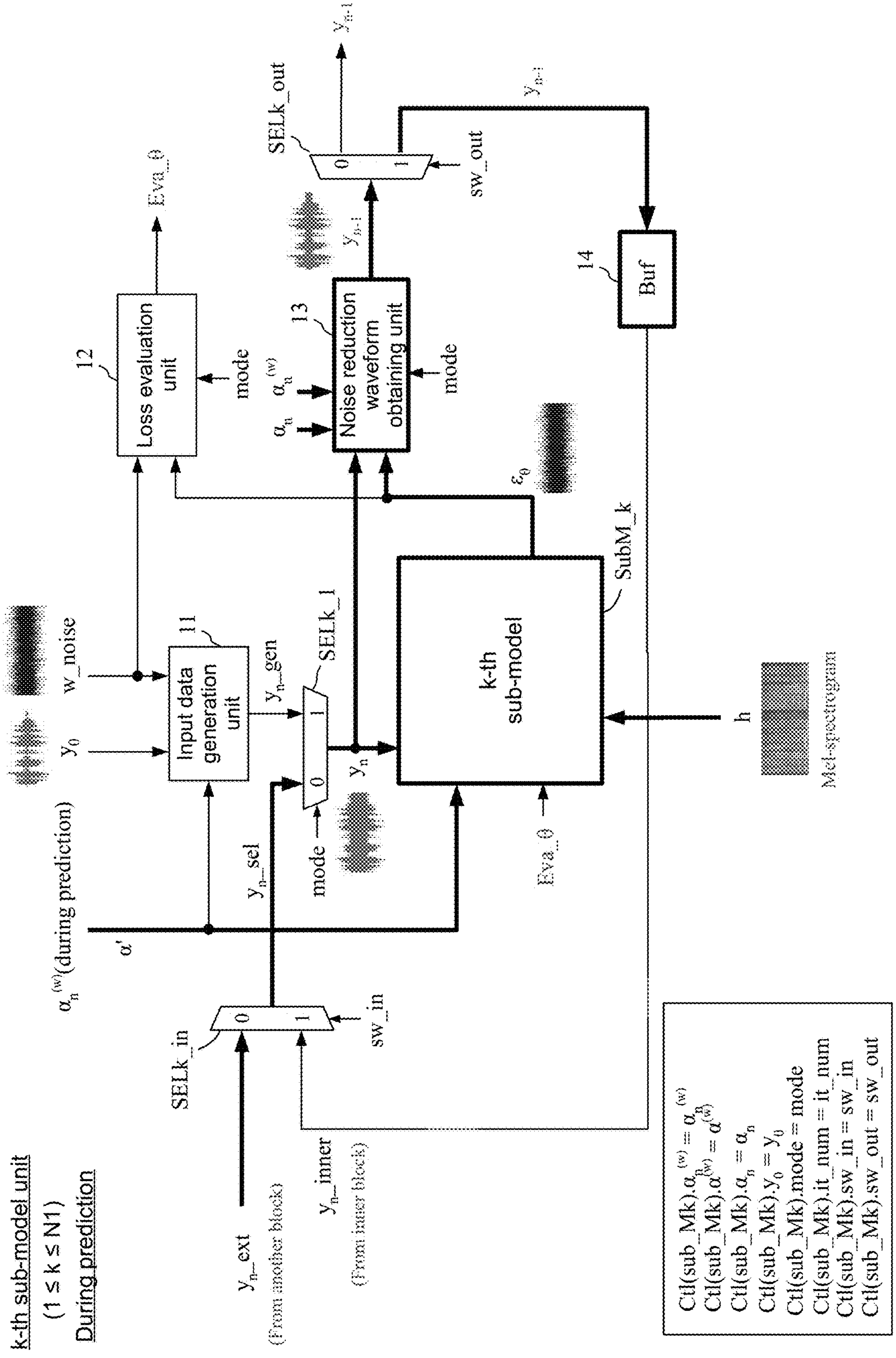
FIG. 14 is a schematic configuration diagram of the k-th sub-model unit of the audio synthesis processing device 100 according to the first embodiment (when prediction processing is performed).

The first sub-model unit 2_1 sets an input signal to the signal $y_4$ and sets n as n=4, and then performs the same processing as the processing performed in the seventh sub-model unit 2_7. As can be seen from the graph in FIG. 10, the processing using the first sub-model unit 2_1 is also performed when n=3, 2, 1; thus, as shown in FIG. 14, the control unit 1 performs switch control to select the terminal "1" of the selector SELk_out, thereby outputting the signal $y_{n-1}$=$y_3$ to the buffer 14.

Figure 15:
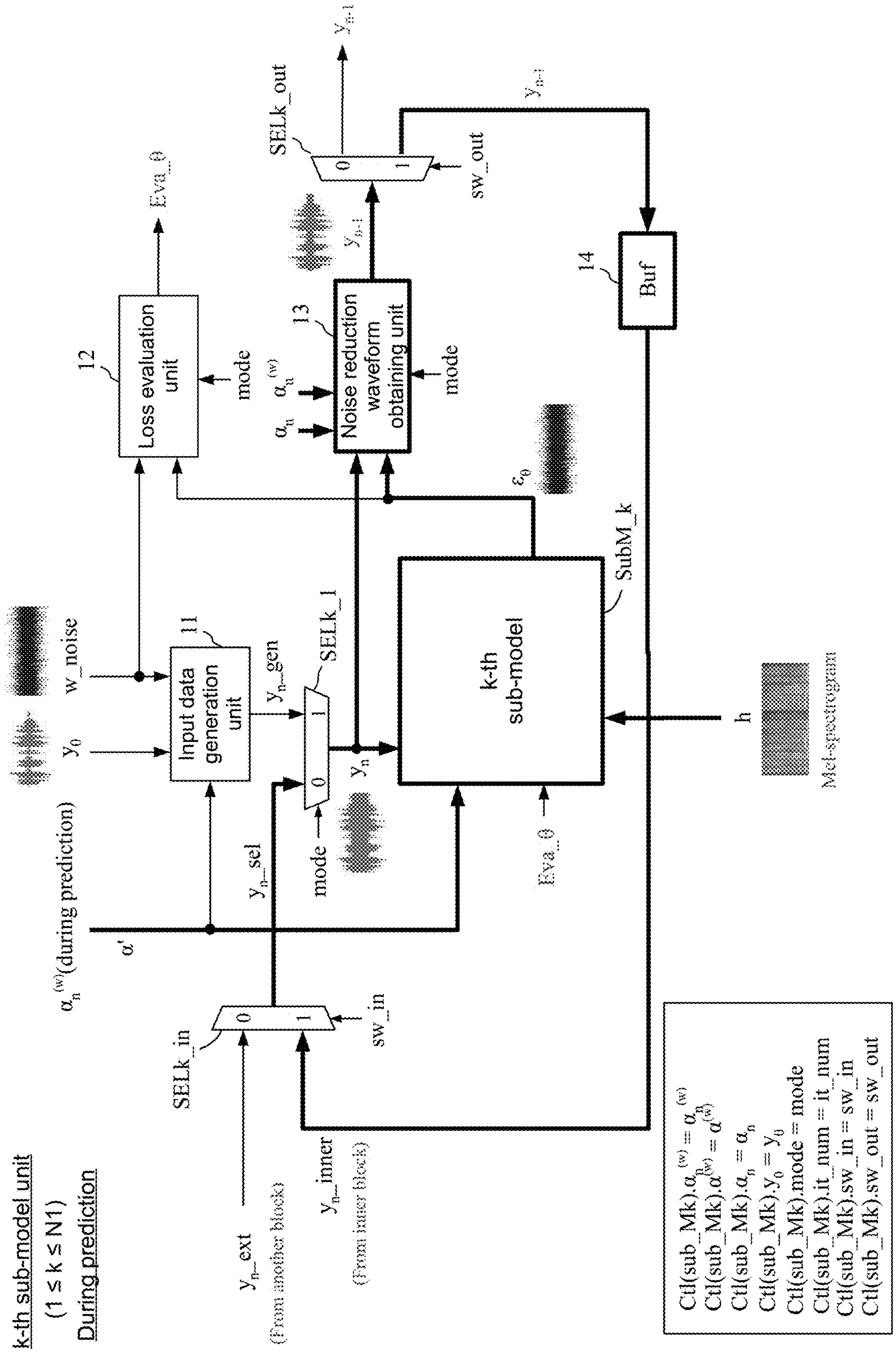
FIG. 15 is a schematic configuration diagram of the k-th sub-model unit of the audio synthesis processing device 100 according to the first embodiment (when prediction processing is performed).

The first sub-model unit 2_1 sets an input signal to the signal $y_3$ and sets n as n=3, and then performs the same processing as the processing performed in the seventh sub-model unit 2_7. Note that the input signal $y_3$ is the signal $y_3$ stored in the buffer 14 when n=4, and the signal $y_3$ is outputted from the buffer 14 to the input selector SELk_in (see FIG. 15). The control unit 1 then performs switch control to select the terminal "1" of the input selector SELk_in.

The signal $y_{n-1}$ (=$y_2$) is obtained in the first sub-model unit 2_1, and the signal $y_{n-1}$ (=$y_2$) is outputted to the buffer 14 via the selector SELk_out (selecting the terminal "1").

Next, the first sub-model unit 2_1 sets an input signal to the signal $y_2$ and sets n as n=2, and then performs the same processing as the processing performed in the seventh sub-model unit 2_7. Note that the input signal $y_2$ is the signal $y_2$ stored in the buffer 14 when n=3, and the signal $y_2$ is outputted from the buffer 14 to the input selector SELk_in (see FIG. 15). The control unit 1 then performs switch control to select the terminal "1" of the input selector SELk_in.

The signal $y_{n-1}$ (=$y_1$) is obtained in the first sub-model unit 2_1, and the signal $y_{n-1}$ (=$y_1$) is outputted to the buffer 14 via the selector SELk_out (selecting the terminal "1").

Next, the first sub-model unit 2_1 sets an input signal to the signal $y_1$ and sets n as n=1, and then performs the same processing as the processing performed in the seventh sub-model unit 2_7. Note that the input signal $y_1$ is the signal $y_1$ stored in the buffer 14 when n=2, and the signal $y_1$ is outputted from the buffer 14 to the input selector SELk_in (see FIG. 15). The control unit 1 then performs switch control to select the terminal "1" of the input selector SELk_in.

The signal $y_{n-1}$ (=$y_0$) is obtained in the first sub-model unit 2_1, and the signal $y_{n-1}$ (=$y_0$) is outputted to the selector SEL0 via the selector SELk_out (selecting the terminal "0").

The control unit 1 then controls the selector SEL0 to select the output from the first sub-model unit 2_1 to obtain (output) the signal $y_0$.

Performing such processing allows the audio synthesis processing device 100 to obtain the audio signal $y_0$ corresponding to the acoustic feature h.

As described above, the audio synthesis processing device 100 can perform audio synthesis processing (prediction processing) by selecting and processing sub-model units determined according to the noise schedule.

In the above description, the case where the noise schedule based on the polygonal line Ptn1 in FIG. 10 is used has been described; the audio synthesis processing device 100 can also perform audio synthesis processing using the noise schedule corresponding to another line (the pattern Ptn2, Ptn3, Ptn4, or Ptn5) in FIG. 10. In such a case as well, the sub-model unit to be used can be determined according to the noise schedule; thus, performing synthesis processing (prediction processing) allows the audio synthesis processing device 100 to perform audio synthesis processing (prediction processing).

Further, in the audio synthesis processing device 100, all N1 (ten) sub-model units may be provided by using the same model (for example, all may be provided by using the DiffWave model, or all may be provided by using the WaveGrad model); alternatively, different models may be mixed to provide N1 (ten) sub-model units.

For example, the WaveGrad model, which has a fast processing speed but slightly inferior audio quality, may be adopted as sub-model unit(s) in the early stage(s) of the audio synthesis processing device 100, and the DiffWave model, which has a slow processing speed but high audio quality, may be adopted as sub-model unit(s) in the last stage(s) of the audio synthesis processing device 100. In the audio synthesis processing device 100, when prediction (audio synthesis) is performed, a signal whose noise is gradually reduced is outputted from the initial sub-model unit (the tenth sub-model unit in FIG. 1) to the following sub-model unit; finally, an audio signal (a signal in which the noise component is most reduced) is outputted from the last sub-model unit (the first sub-model unit in FIG. 1). In other words, for the sub-model units in the early stages, it is sufficient to output a signal obtained by slightly reducing the noise component from the Gaussian white noise w_noise, and therefore the prediction process is relatively simple, whereas the sub-model units in the last stages need to output a signal in which the noise component is considerably reduced from the noise w_noise, and therefore it is difficult to perform prediction. Thus, in the audio synthesis processing device 100, high-speed but low-quality sub-models are arranged in the early stages, and low-speed but high-quality sub-models are arranged in the stages closer to the end, thereby allowing for enhancing the quality of the audio signal(s) obtained (predicted) by the audio synthesis processing device 100.

For example, in the case described above (when the noise schedule based on the pattern Ptn1 in FIG. 10 is adopted), the WaveGrad model, which has a fast processing speed but slightly inferior audio quality, may be adopted in the seventh sub-model unit 2_7 and the second sub-model unit 2_2, which are sub-model units in the early stage, and the DiffWave model, which has a slow processing speed but high audio quality, may be adopted in the first sub-model unit 2_1, which is a sub-model unit in the last stage.

This enables the audio synthesis processing device 100 to perform high-quality audio synthesis processing (prediction processing) while improving the total processing speed.

Furthermore, in the audio synthesis processing device 100, the noise schedule may be determined so that the sub-model units used are distributed.

Figure 16:
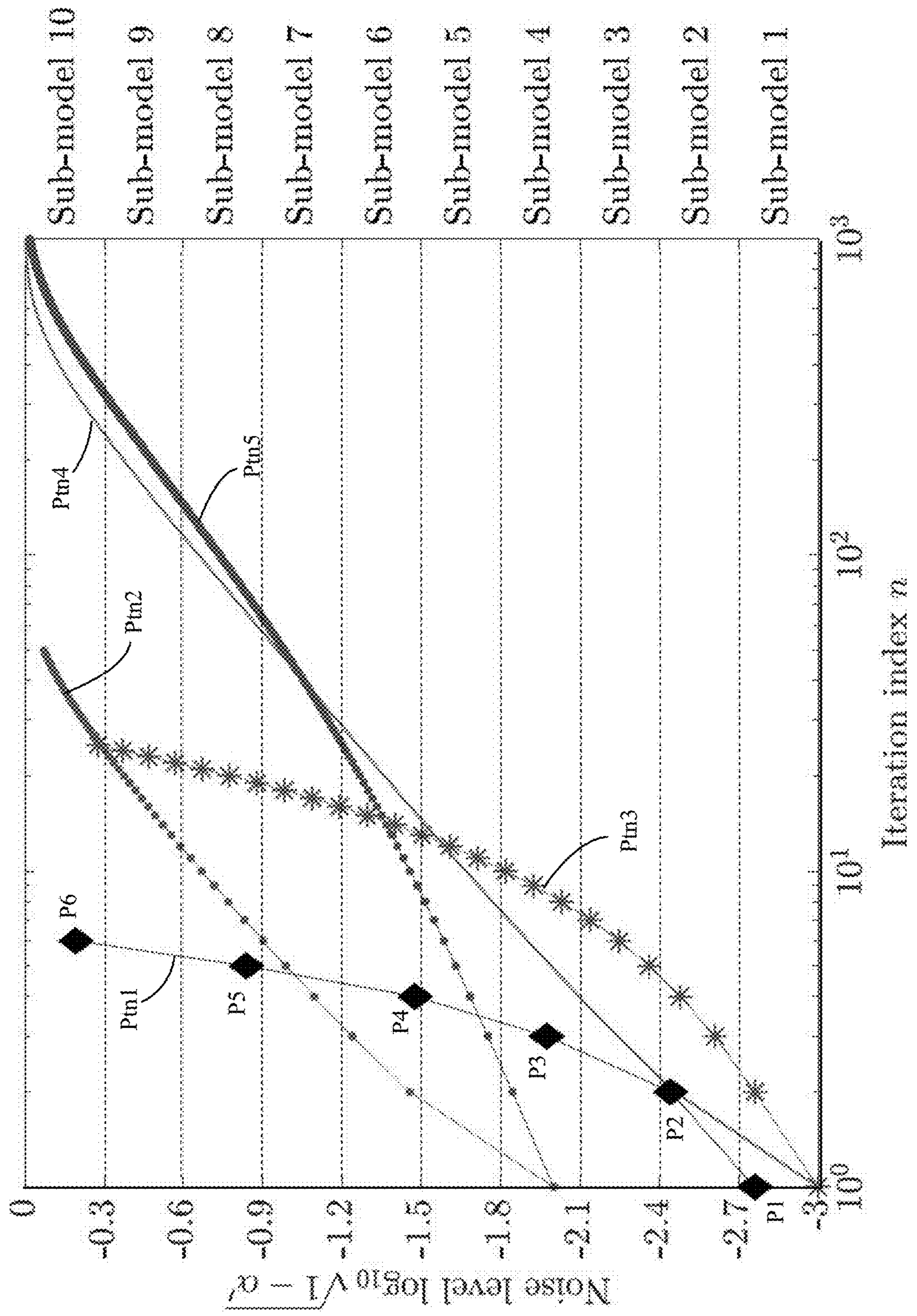
FIG. 16 is a graph (vertical axis: log scale) showing the relationship between index n indicating the order of processing and converted noise level sqrt(1−α').

For example, as shown in FIG. 16, the noise schedule ($=\{\beta_1, \beta_2, \ldots, \beta_N\}$) may be determined from the converted noise level with the vertical axis of FIG. 10 being log scale.

FIG. 16 is the graph of FIG. 10 with the vertical axis in log scale. As can be seen from the graph in FIG. 10, the sub-model units determined from the noise schedule (the sub-model units used in the prediction process) are distributed.

For example, when the noise schedule determined by the pattern Ptn1 is adopted, in the case of FIG. 10, the sub-model units to be used are as follows.

(A1) Seventh sub-model unit 2_7 (the number of times of processing: 1) (corresponding to the point P6 in FIG. 10)

(A2) Second sub-model unit 2_2 (the number of times of processing: 1) (corresponding to the point P5 in FIG. 10)

(A3) First sub-model unit 2_1 (the number of times of processing: 4) (corresponding to the points P4 to P1 in FIG. 10)

Conversely, in the case of FIG. 16, the sub-model units to be used are as follows.

(B1) Tenth sub-model unit 2_10 (the number of times of processing: 1) (corresponding to the point P6 in FIG. 16)

(B2) Eighth sub-model unit 2_8 (the number of times of processing: 1) (corresponding to the point P5 in FIG. 16)

(B3) Sixth sub-model unit 2_6 (the number of times of processing: 1) (corresponding to the point P4 in FIG. 16)

(B4) Fourth sub-model unit 2_4 (the number of times of processing: 1) (corresponding to the point P3 in FIG. 16)

(B5) Second sub-model unit 2_2 (the number of times of processing: 1) (corresponding to the point P2 in FIG. 16)

(B6) First sub-model unit 2_1 (the number of times of processing: 1) (corresponding to the point P1 in FIG. 16)

There is no sub-model unit that performs the process multiple times, and the used sub-model units are distributed. As for the processing of (B1) to (B6) above, as in the above embodiment, the control unit 1 selects sub-model units to be used (selected by the selector), and performing processing by each sub-model unit allows the audio synthesis processing (prediction processing) to be performed in the audio synthesis processing device 100.

In the audio synthesis processing device 100, the accuracy of the audio synthesis processing is improved by distributing the sub-model units used. This is because, if the processing accuracy of sub-model unit(s) with a large number of times of processing is poor, the prediction accuracy of that sub-model unit(s) affects the entire processing accuracy.

In the audio synthesis processing device 100, distributing the sub-model unit(s) used makes it possible to prevent the processing accuracy of specific sub-model unit(s) from being greatly affected; as a result, the processing accuracy of the audio synthesis processing as a whole is improved.

As described above, in the audio synthesis processing device 100, a plurality of sub-model units are provided according to the noise level, and training processing can be performed independently (in parallel) on the plurality of sub-model units, thereby allowing for greatly reducing the training processing time.

In addition, the audio synthesis processing device 100 performs audio synthesis processing (prediction processing) by using sub-model units where trained models trained according to the noise level in accordance with the noise schedule has been each constructed.

Furthermore, the audio synthesis processing device 100 can adopt (combine) appropriate sub-model units according to the noise level, thus allowing for achieving the audio synthesis processing that obtains a high-quality audio signal while maintaining the speed of the audio synthesis processing.

Second Embodiment

Next, a second embodiment will be described. In addition, the same reference numerals are given to the same parts as in the above-described embodiment, and detailed description thereof will be omitted.

In the first embodiment, the case of performing audio synthesis processing (a signal processing device (audio synthesis processing device) that generates an audio signal) has been described; in the second embodiment, a case of performing image generation processing (a signal processing device that generates an image signal) will be described.

Figure 17:
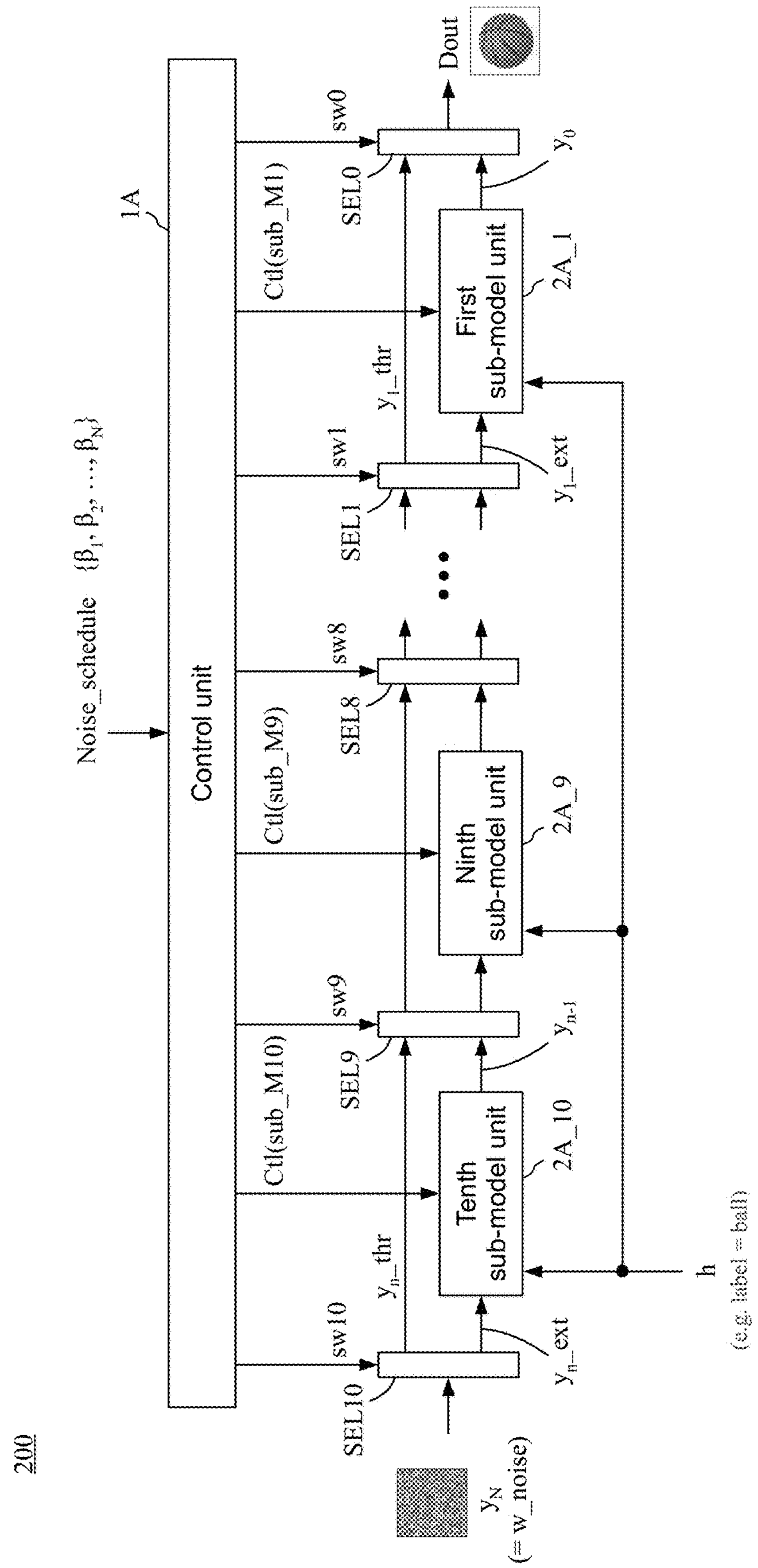
FIG. 17 is a schematic configuration diagram of a signal generation processing device 200 according to a second embodiment.

FIG. 17 is a schematic configuration diagram of a signal generation processing device 200 according to the second embodiment.

Figure 18:
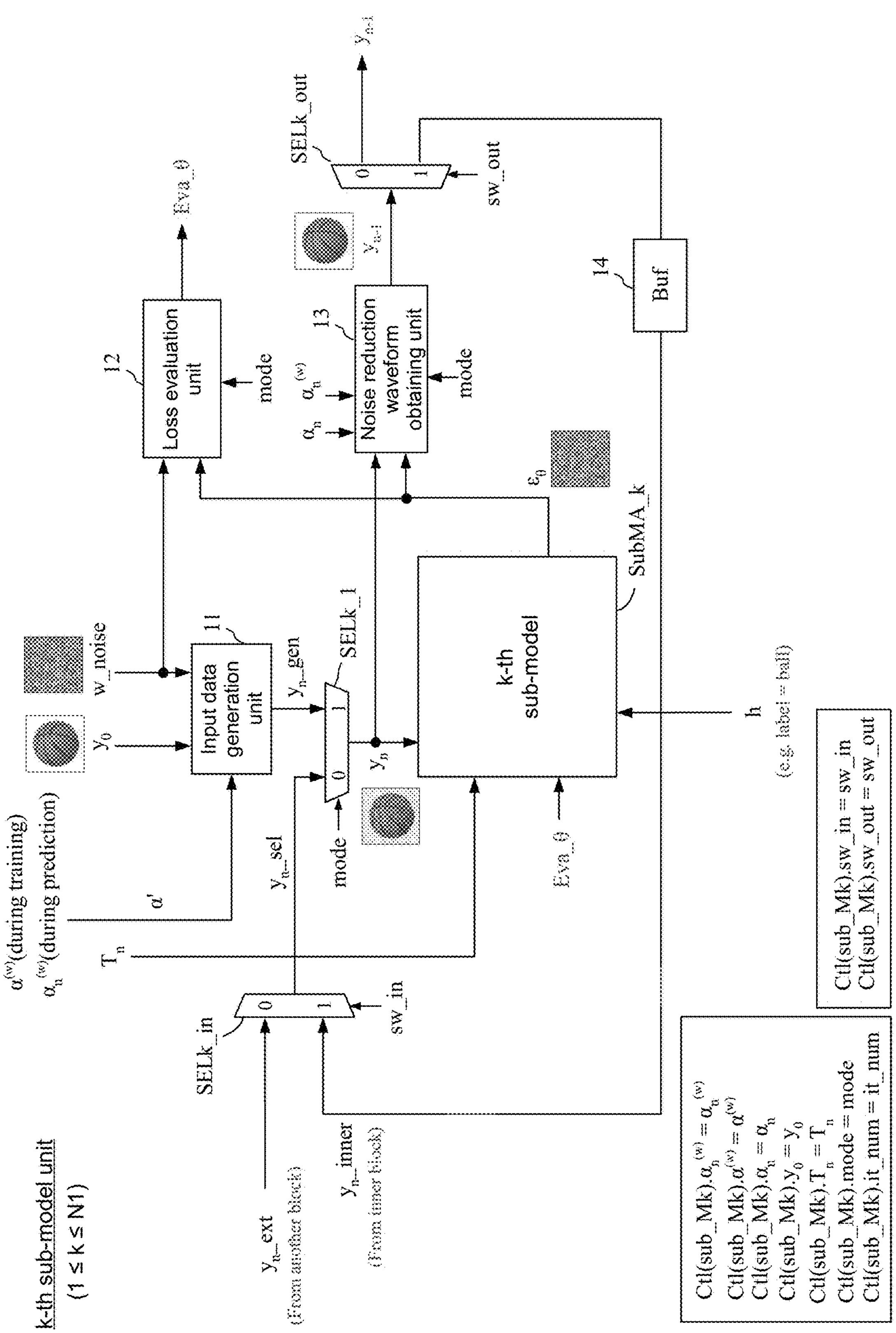
FIG. 18 is a schematic configuration diagram of a k-th sub-model unit of the signal generation processing device 200 according to the second embodiment.

FIG. 18 is a schematic configuration diagram of the k-th sub-model unit of the signal generation processing device 200 according to the second embodiment.

Figure 19:
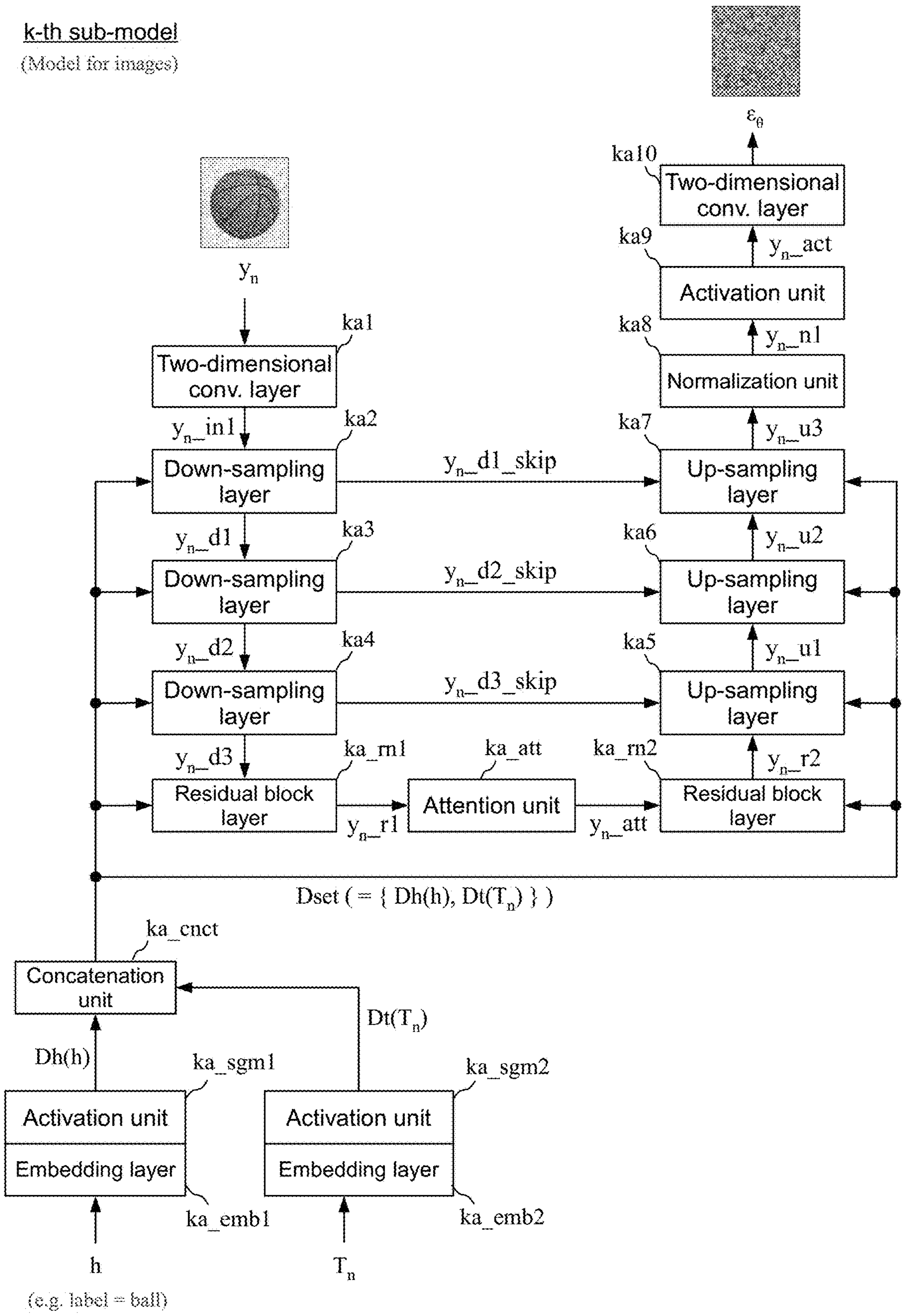
FIG. 19 is a schematic configuration diagram of the k-th sub-model (model for images) of the k-th sub-model unit of the signal generation processing device 200 according to the second embodiment.

FIG. 19 is a schematic configuration diagram of the k-th sub-model (a model for images) of the k-th sub-model unit of the signal generation processing device 200 according to the second embodiment.

Figure 20:
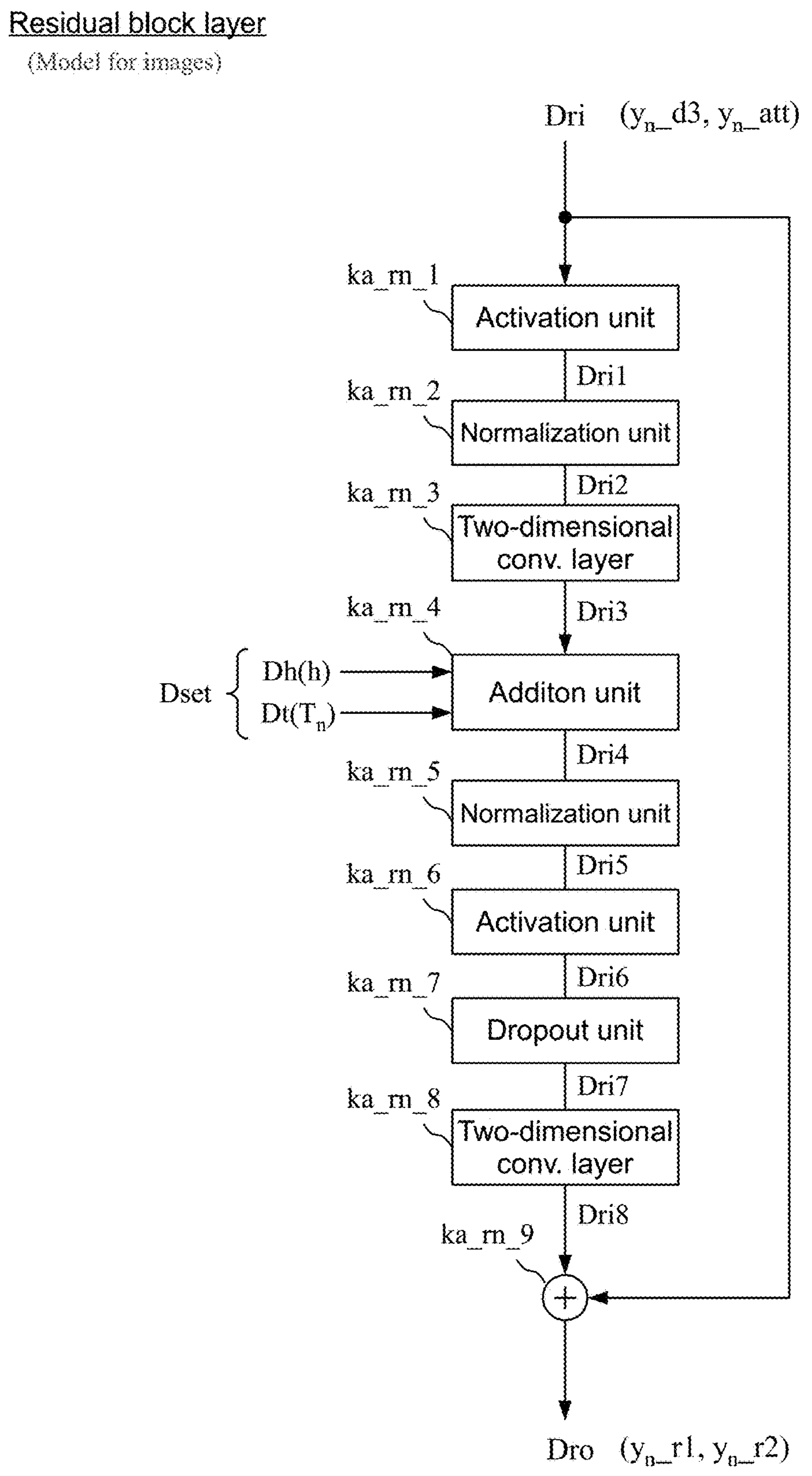
FIG. 20 is a schematic configuration diagram of a residual block layer of the k-th sub-model (model for images) of the signal generation processing device 200 according to the second embodiment.

FIG. 20 is a schematic configuration diagram of a residual block layer of the k-th sub-model (model for images) of the signal generation processing device 200 according to the second embodiment.

2.1: Configuration of Signal Generation Processing Device

FIG. 17 corresponds to FIG. 1 of the first embodiment, and the configuration will be described by paying attention to the differences from FIG. 1.

The signal generation processing device 200 of the second embodiment includes control unit 1A replacing the control unit 1, a first sub-model unit 2A_1 to a tenth sub-model unit 2A_10 respectively replacing the first sub-model unit 2_1 to the tenth sub-model unit 2_10 of the audio synthesis processing device 100 of the first embodiment.

Further, in the audio synthesis processing device 100 of the first embodiment, the signal $y_N$ inputted into the audio synthesis processing device 100 is Gaussian white noise w_noise, that is, a signal whose signal value at time t follows a Gaussian distribution (normal distribution); conversely, in the signal generation processing device 200 of the second embodiment, the signal $y_N$ inputted into the signal generation processing device 200 is Gaussian white noise w_noise forming a two-dimensional image (for example, an image of P pixels×Q pixels (P, Q: natural numbers)), that is, a signal (a signal forming an image) whose pixel value D(x, y) follows a Gaussian distribution (normal distribution) assuming that a pixel value of the coordinates (x, y) in the two-dimensional image is expressed as D(x, y).

Further, in the audio synthesis processing device 100 of the first embodiment, the condition input to the audio synthesis processing device 100 is the acoustic feature h, whereas in the signal generation processing device 200 of the second embodiment, the condition input to the signal generation processing device 200 is data h specifying a label (for example, a one-hot vector or one-hot data).

FIG. 18 corresponds to FIG. 2 of the first embodiment, and since the second embodiment targets images to be processed, there are some differences from the first embodiment (configuration of FIG. 2). The input data generation unit 11 is a functional unit that operates in a training mode (a mode for performing training processing), and receives image data $y_0$ (correct data) and Gaussian white noise w_noise (a Gaussian white noise that can form a two-dimensional image), weighting noise level data α' (during training: $\alpha'=\alpha^{(w)}$, during prediction: $\alpha'=\alpha^{(w)}$), and data $T_n$ for time steps (the time step $T_n$ (n is a natural number satisfying 1≤n≤N) is a time step at which processing using the noise level data $\alpha_n$ (n is a natural number satisfying 1≤n≤N) is performed). The input data generation unit 11 synthesizes the image data $y_0$ and the Gaussian white noise w_noise based on the weighting noise level data α', and then transmits the synthesized data as image noise synthesis data $y_n$_gen to the selector SEL_k1. Note that the size of the image formed by the image data $y_0$ and the size of the image formed by the Gaussian white noise w_noise are assumed to be the same; the image data $y_0$ and the Gaussian white noise w_noise are synthesized by adding the pixel values of the same coordinates to each other. Further, weighting noise level data α' (during training: $\alpha'=\alpha^{(w)}$, during prediction: $\alpha'=\alpha_n^{(w)}$) and time step data $T_n$ are included in sub-model control signal Ctl(sub_Mk) transmitted from the control unit 1A to the k-th sub-model unit. Also, the weighting noise level data $\alpha_n^{(w)}$ during prediction included in the sub-model control data Ctl(sub_Mk) is expressed as "Ctl(sub_Mk).$\alpha_n^{(w)}$". Also, the weighting noise level data $\alpha^{(w)}$ during training included in the sub-model control data Ctl(sub_Mk) is expressed as "Ctl(sub_Mk).$\alpha^{(w)}$". Also, the data $T_n$ for the time step included in the sub-model control data Ctl (sub_Mk) is expressed as "Ctl(sub_Mk).$T_n$".

The k-th sub-model SubMA_k receives the signal $y_n$ transmitted from the selector SEL_k1, the data $T_n$ for the time step, and the condition h that is data specifying the label (for example, one-hot vector or one-hot data) (for example, as shown in FIGS. 17 and 18, the condition h is data indicating a "ball"). Also, the k-th sub-model SubMA_k receives the loss evaluation data Eva_θ transmitted from the loss evaluation unit 12 when training processing is performed (when in the training mode). The k-th sub-model SubMA_k is, for example, a model using a neural network, and performs training processing so that Gaussian white noise (Gaussian white noise w_noise capable of forming a two-dimensional image) is outputted based on the signal $y_n$ (signal $y_n$ forming an image), the data $T_n$ for time steps, and the condition h (data specifying a label), which are inputted during the training processing. In other words, the k-th sub-model SubMA_k receives the signal $y_n$ (the signal $y_n$ that forms an image), the data $T_n$ for the time step, and the condition h, and transmits the output signal $\varepsilon_\theta$ (the output signal $\varepsilon_\theta$ that forms an image) to the loss evaluation unit 12. The loss evaluation unit 12 obtains Eva_θ, which is data obtained by evaluating the loss between the output signal $\varepsilon_\theta$ and the Gaussian white noise w_noise; in accordance with the data Eva_θ, the k-th sub-model SubMA_k updates parameters, and performs training so that the difference between the output signal Co and Gaussian white noise w_noise is within a predetermined range.

The k-th sub-model SubM_k constructs a model, in which the parameters (optimization parameters) obtained by the training processing have been set, as a trained model; during prediction (during image signal generation processing), the k-th sub-model SubM_k performs prediction processing using the trained model. During prediction, the k-th sub-model SubMA_k obtains the output signal $\varepsilon_\theta$ by performing prediction processing with the signal $y_n$, the data $T_n$ for the time step, and the condition h as inputs, and then transmits the output signal $\varepsilon_\theta$ to the noise reduction waveform obtaining unit 13.

The k-th sub-model SubMA_k can be provided by using the configuration shown in FIG. 19, for example. Also, the residual block layer in FIG. 19 can be provided by using the configuration shown in FIG. 20, for example. For the implementation of the above-described configurations, programs related to Non-Patent Document A, which will be described later, is disclosed at the URL below, so the detailed description of the implementation of the configurations will be omitted.

URL that discloses programs related to Non-Patent Document A: https://github.com/hojonathanho/diffusion A brief description of the difference from the configuration shown in FIG. 5 is as follows.

As shown in FIG. 19, the condition h and the time step $T_n$ transmitted from the control unit 1A are subjected to embedding processing and activation processing, and then combined; the combined data Dset (={Dh(h), Dt($T_n$)}) is transmitted to the down-sampling layers ka2 to ka4 and the up-sampling layers ka5 to ka7. Each of down-sampling layers down-samples its input based on the data Dset. Each of up-sampling layers up-samples its input based on the data Dset.

The residual block layers ka_rn1 and ka_rn2 are provided by using the configuration shown in FIG. 20, as described above. In the residual block layer, the outputs through the plurality of network layers in the residual block layer and the inputs into the residual block layer are added and then outputted. For example, as shown in FIG. 20, the plurality of network layers include an activation unit ka_rn_1, a normalization unit ka_rn_2, a two-dimensional convolutional layer ka_rn_3, an addition unit ka_rn_4, a normalization unit ka_rn_5, an activation unit ka_rn_6, a dropout unit ka_rn_7, and a two-dimensional convolutional layer ka_rn_8. Data Dset is also inputted into the addition unit ka_rn_4. An attention unit ka_att is placed between the two residual block layers, attention processing (processing by the attention mechanism) is performed on the input, thereby obtaining context data (for example, context vector). Weighting processing (or processing of adding the obtained context data to the data $y_n$_r1) is then performed on the data $y_n$_r1 based on the obtained context data.

The loss evaluation unit 12 has the same configuration and functions as those in the first embodiment. Note that input data into the loss evaluation unit 12 is data w_noise and a signal $\varepsilon_\theta$ (noise signal) that are capable of forming a two-dimensional image.

The noise reduction waveform obtaining unit 13 has the same configuration and functions as those in the first embodiment. Note that the input data into the loss evaluation unit 12 is the signal $y_n$ and the signal $\varepsilon_\theta$ (noise signal) that are capable of forming a two-dimensional image, and the output data is also the signal $y_{n-1}$ that is capable of forming a two-dimensional image.

The output selector SELk_out and the buffer 14 have the same configurations and functions as those in the first embodiment.

2.2: Operation of Signal Generation Processing Device

The operation of the signal generation processing device 200 configured as described above is substantially the same as in the case of the first embodiment, and the following description will focus on the points of difference.

In the signal generation processing device 200 shown in FIG. 17, as in the case of the audio synthesis processing device, the case where the number of sub-models is "10" will be described, for convenience of description.

2.2.1: Training Processing

As in the case of audio, sub-models are determined for noise levels to be associated with. The method of determining sub-model(s) to be trained in accordance with the converted noise level sqrt(1−α') is the same as the method for audio.

Figure 21:
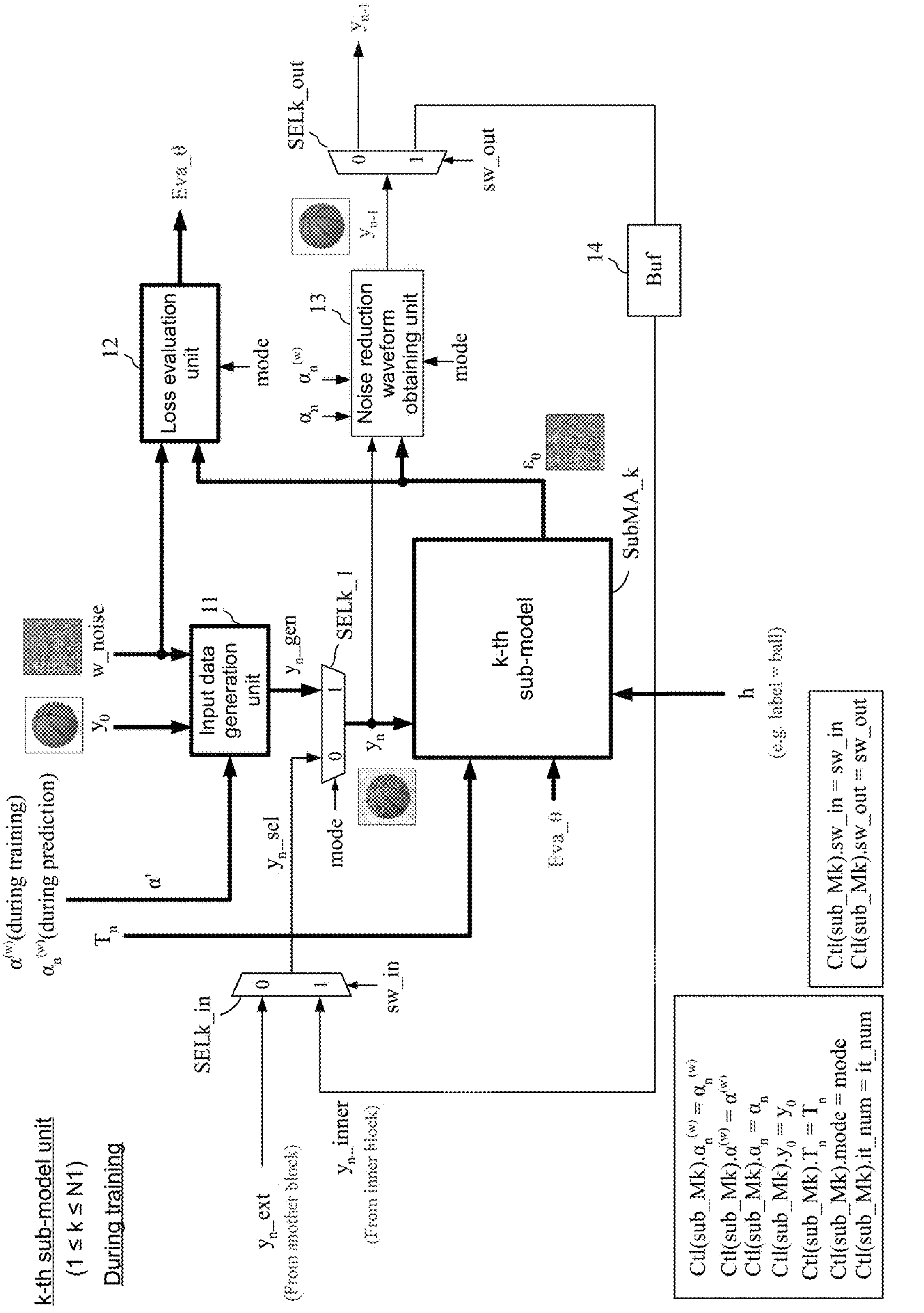
FIG. 21 is a schematic configuration diagram of the k-th sub-model unit of the signal generation processing device 200 according to the second embodiment (when training processing is performed).

As shown in FIG. 21, in the signal generation processing device 200 that processes an image, as described above, the audio waveform signal $y_0$ needs to be read as the image signal $y_0$, the Gaussian white noise w_noise needs to be read as the Gaussian noise w_noise forming a two-dimensional image, and the acoustic feature h needs to be read as data h of a label specifying an image (for example, a ball).

Moreover, the fact that the time step data $T_n$ is inputted into the k-th sub-model (k=1) is also different from the case of audio.

From this, the loss function is defined by the following equation (where time step t is used instead of c for audio processing).

$$\text{Loss}=E_{\epsilon,t}[\|\epsilon-\epsilon_\theta(\sqrt{\alpha^{(w)}}y_0+\sqrt{1-\alpha^{(w)}}\epsilon, h, t)\|_2{}^2] \quad \text{Formula 4}$$

Based on the value of this loss function, training the k-th sub-model and obtaining a trained model are the same as in the first embodiment.

Thus, in the signal generation processing device 200, training processing can be performed independently for each of N1 (ten) sub-model units. In other words, when in each of the N1 (ten) sub-model units, the image signal $y_0$ as the correct data, the condition data h corresponding thereto, the Gaussian white noise w_noise, and the noise level that determines the ratio of synthesizing them is known, the training processing can be performed, thus allowing the training processing of N1 (ten) sub-model units to be performed in parallel. This allows the signal generation processing device 200 to speed up the training processing.

In the above description, the case where the neural network model of FIG. 19 is adopted in the signal generation processing device 200 has been described, but the present invention should not be limited to this, and a model other than the neural network model shown in FIG. 19 may be adopted.

Further, in the signal generation processing device 200, all of the N1 (ten) sub-model units may be provided by using the same model, or different models may be mixed to provide the N1 (ten) sub-model units.

For example, a neural network model that has a high processing speed but slightly inferior quality of generated images may be adopted as sub-model units in the early stage(s) of the signal generation processing device 200, and a neural network model that has a low processing speed but high quality of generated images may be adopted as sub-model units in the last stage(s) of the signal generation processing device 200.

2.2.2: Prediction Processing (Image Generation Processing)

Next, prediction processing (image generation processing) by the signal generation processing device 200 will be described.

For convenience of explanation, a case in which the noise schedule (={$\beta_1$, $\beta_2$, . . . , $\beta_N$}, N=1000) is determined so that the converted noise levels sqrt(1−α') are equally spaced will be explained. Also, a case will be described in which, during training, converted noise levels for 1000 steps (noise levels that define noise for 1000 steps whose level are equally spaced) are divided into 10 levels with them equally spaced, sub-model units (the first sub-model unit 2A_1 to the tenth sub-model unit 2A_10) are each trained using the divided converted noise levels for every 100 steps to obtain trained models.

The control unit 1 determines sub-model units to be used in accordance with the noise schedule (={$\beta_1$, $\beta_2$, . . . , $\beta_N$}, N=1000) that has been determined so that converted noise levels are equally spaced. Specifically, sub-model units to be used are determined so that in performing prediction processing in 1000 steps, each sub-model unit (first sub-model unit 2A_1 to tenth sub-model unit 2A_10) performs processing in 100 steps; the sub-model units to be used are determined as follows.

(1) Steps 1000 to 901 are processed by the tenth sub-model unit 2A_10.
(2) Steps 900 to 801 are processed by the ninth sub-model unit 2A_9.
(3) Steps 800 to 701 are processed by the eighth sub-model unit 2A_8.
(4) Steps 700 to 601 are processed by the seventh sub-model unit 2A_7.
(5) Steps 600 to 501 are processed by the sixth sub-model unit 2A_6.
(6) Steps 500 to 401 are processed by the fifth sub-model unit 2A_5.
(7) Steps 400 to 301 are processed by the fourth sub-model unit 2A_4.
(8) Steps 300 to 201 are processed by the third sub-model unit 2A_3.
(9) Steps 200 to 101 are processed by the second sub-model unit 2A_2.
(10) Steps 100 to 1 are processed by the first sub-model unit 2A_1.

Figure 22:
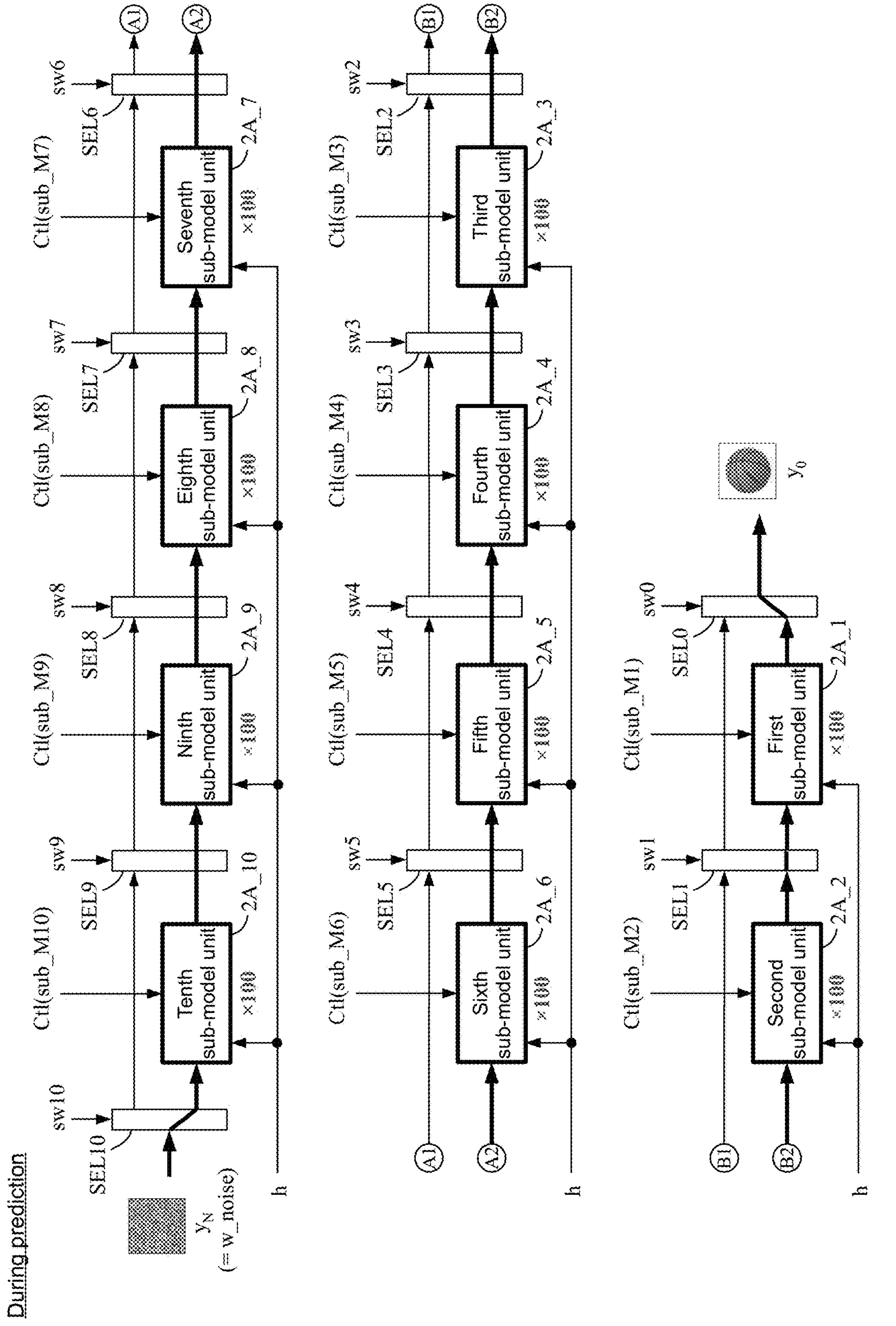
FIG. 22 is a diagram extracting selectors and the k-th sub-model unit of the signal generation processing device 200, and clearly showing sub-model units used in accordance with a noise schedule.

FIG. 22 is a diagram extracting selectors and the k-th sub-model unit of the signal generation processing device 200, and clearly showing sub-model units used in accordance with a noise schedule.

When the sub-model units to be used are determined as described above, the control unit 1A controls the selectors SEL10 to SEL1 so as to be switched to select the path to the sub-model unit as shown in FIG. 22; furthermore, the control unit 1A controls the selector SEL0 so as to be switched to select the path to the first sub-model unit 2A_1. As a result, the Gaussian white noise w_noise (=$y_N$, N=1000) inputted into the selector SEL10 is inputted to the tenth sub-model unit 2A_10.

The control unit 1A also outputs sub-model control data Ctl(sub_M10) to the tenth sub-model unit 2A_10.

Figure 23:
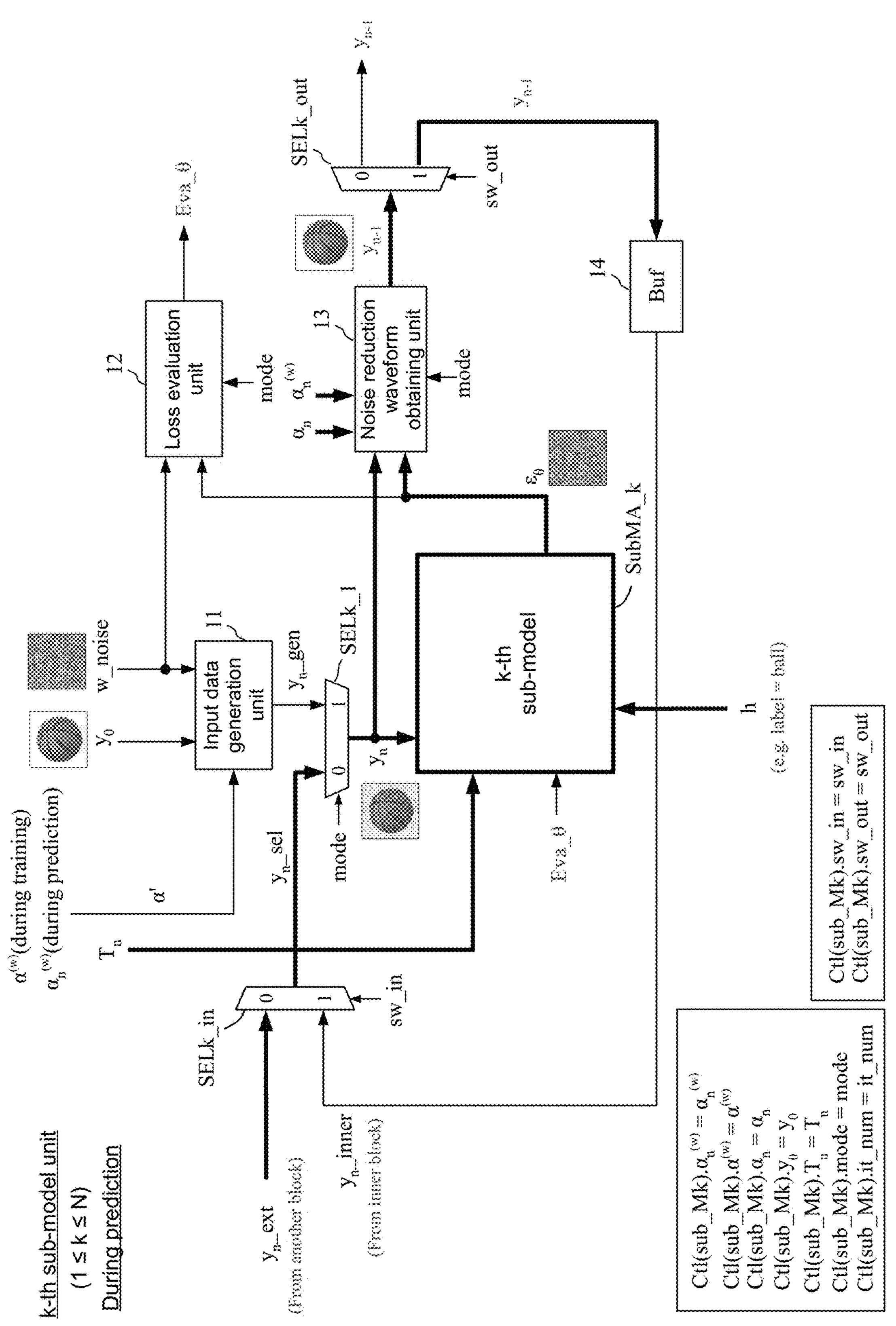
FIG. 23 is a schematic configuration diagram of the k-th sub-model unit of the signal generation processing device 200 according to the second embodiment (when prediction processing is performed).

FIG. 23 is a schematic configuration diagram of the k-th sub-model unit during prediction processing.

In the tenth sub-model unit 2A_10, the signal $y_n$_ext shown in FIG. 23 is the signal $y_N$ (=w_noise). The control unit 1A selects the terminal "0" of the input selector SELk_in, further selects the terminal "0" of the selector SELk_1, and then the signal $y_N$ (=w_noise) is inputted into the k-th sub-model (k=10). Also, the time step data $T_n$ and the condition data h are inputted into the k-th sub-model (k=10).

In the k-th sub-model SubMA_k (k=10), the functional unit shown in FIG. 19 performs processing (processing by the trained model) to obtain the signal co. The signal co obtained by the k-th sub-model SubMA_k (k=10) is then transmitted to the noise reduction waveform obtaining unit 13.

The noise reduction waveform obtaining unit 13 receives the signal $y_n$ ($y_N$ (=w_noise)) transmitted from the selector SEL_k1, the signal $\varepsilon_\theta$ transmitted from the k-th submodel SubMA_k (k=10), and the noise level data $\alpha_n$ (n=1000) and weighting noise level data $\alpha_n^{(w)}$ (n=1000) transmitted from the control unit 1A. The noise reduction waveform obtaining unit 13 performs noise reduction processing using the signal $y_n$ and the signal $\varepsilon_\theta$ based on the noise level data $\alpha_n$ and the weighting noise level data $\alpha_n^{(w)}$. Specifically, the noise reduction waveform obtaining unit 13 obtains the signal $y_{n-1}$ (n=1000) after noise reduction processing by performing processing corresponding to the following formula.

Formula 5

$$y_{n-1} = \frac{1}{\sqrt{\alpha_n}}\left(y_n - \frac{1-\alpha_n}{\sqrt{1-\alpha_n^{(w)}}}\varepsilon_\theta(y_n, T_n, h)\right) + \sigma_n z$$

$$\sigma_n = \sqrt{\frac{\beta_n\left(1-\alpha_{n-1}^{(w)}\right)}{\left(1-\alpha_n^{(w)}\right)}}$$

$$z \sim N(0, I) (\text{when } n > 0) (I \text{ is the identity matrix})$$

$$z = 0 \quad (\text{when } n = 0)$$

The noise reduction waveform obtaining unit 13 then transmits the signal $y_{n-1}$ obtained as described above to the output selector SELk_out.

The control unit 1A selects the terminal "1" of the output selector SELk_out and outputs the signal $y_{n-1}$ to the buffer 14.

Next, the tenth sub-model unit 2A_10 sets an input signal to the signal $y_{999}$ and sets n as n=999, and then performs the same processing as the processing performed in the tenth sub-model unit 2_10 when n=1000. Note that the input signal $y_{999}$ is the signal $y_{1000}$ stored in the buffer 14 when n=1000, and the signal $y_{1000}$ is outputted from the buffer 14 to the input selector SELk_in. The control unit 1A then performs switch control to select the terminal "1" of the input selector SELk_in.

Then, in the tenth sub-model unit 2A_10, the signal $y_{n-1}$ (=$y_{998}$) is obtained, and the signal $y_{n-1}$ (=$y_{999}$) is outputted to the buffer 14 via the selector SEL1 (selecting the terminal "1").

From n=998 to n=902, the same processing as the above processing is performed.

The tenth sub-model unit 2A_10 sets an input signal to the signal $y_{901}$ and sets n as n=901, and then performs the same processing as the above processing. Note that the input signal $y_{901}$ is the signal $y_{902}$ stored in the buffer 14 when n=902, and the signal $y_{902}$ is outputted from the buffer 14 to the input selector SELk_in. The control unit 1A then performs switch control to select the terminal "1" of the input selector SELk_in.

The signal $y_{n-1}$ (=$y_{900}$) is then obtained in the tenth sub-model unit 2A_10, and the signal $y_{n-1}$ (=$y_{900}$) is outputted to the selector SEL9 via the selector SELk_out (selecting the terminal "0").

The control unit 1A then switches the selector SEL9 so as to select the path to the ninth sub-model unit 2A_9, and the signal $y_{900}$ is inputted into the ninth sub-model unit 2A_9.

For n=900 to n=801, the ninth sub-model unit 2A_9 performs the same processing as in the tenth sub-model unit 2A_10.

Furthermore, the eighth sub-model unit 2A_8 to the first sub-model unit 2A_1 also perform the same processing as in the tenth sub-model unit 2A_10.

The control unit 1A then controls the selector SEL0 to select the output from the first sub-model unit 2A_1 to obtain (output) the signal $y_0$.

Performing such processing allows the signal generation processing device 200 to obtain the image signal $y_0$ corresponding to the condition data h.

As described above, the signal generation processing device 200 selects sub-model units determined in accordance with the noise schedule, and performs processing with the selected sub-model units, thereby allowing for performing processing (prediction processing) that generates an image signal.

In the above description, the case of using the converted noise level with equally spaced noise levels has been described, but the present invention should not be limited to this; the noise schedule may be determined in accordance with values obtained by taking the logarithm of the noise levels (converted noise levels), and then, the training processing and the prediction processing in the signal generation processing device 200 may be performed in accordance with the noise schedule.

As described above, in the signal generation processing device 200, a plurality of sub-model units are provided in accordance with the noise levels, and training processing can be performed independently (in parallel) on the plurality of sub-model units, thus allowing for greatly reducing the training processing time.

In addition, the signal generation processing device 200, in accordance with the noise schedule, uses sub-model units where trained models trained in accordance with the noise level have been each constructed, thereby performing processing (prediction processing) for generating an image signal. Furthermore, the signal generation processing device 200 can adopt (combine) appropriate sub-model units in accordance with the noise level, thus allowing for generating high-quality image signals while maintaining the speed of signal generation processing (image signal generation processing).

In the above description, the case of inputting the condition data h has been described, but the present invention should not be limited to this; the signal generation processing device 200 may perform processing without inputting the condition data h. In this case, a comparative experiment was conducted with the case of using the technique of Non-Patent Document A below.

Non-Patent Document A:

J. Ho, A. Jain, and P. Abbeel, "Denoising diffusion probabilistic models," in Proc. NeurIPS, December 2020.

Specifically, an image generation neural network model was trained with 50,000 CIFAR10 training images. In the model of Non-Patent Document A, the noise levels of 1000 steps are used for training, and in the present invention (equivalent to the signal generation processing device 200 without the input of condition data h), ten sub-model units are trained, each of which has been trained for 800,000 steps using noise levels for every 100 steps obtained by equally dividing 1000 steps into ten parts. When image generation is performed (during prediction processing), random noise (Gaussian white noise) is used as an input for unconditional generation, and a random image is generated each time. To verify the accuracy of these generated images, we calculated the FID (Fenchel Inception Distance) between 50,000 generated images and 50,000 training images. The result is as follows.

FID with the method of Non-Patent Document A: 5.71

FID with the present invention: 5.50

Thus, it was confirmed that the present invention (corresponding to the signal generation processing device 200 without the input of the condition data h) has higher image generation accuracy.

Other Embodiments

The case where the audio synthesis processing device of the above-described embodiment uses the DiffWave model and the WaveGrad model for the sub-model units has been described, but the present invention should not be limited to this; other models that can obtain the audio waveform corresponding to the acoustic feature from the Gaussian white noise and acoustic features may be used.

Each block of the audio synthesis processing device and signal generation processing device described in the above embodiment may be formed using a single chip with a semiconductor device, such as LSI, or some or all of the blocks of the audio synthesis processing device and signal generation processing device may be formed using a single chip.

Note that although the term LSI is used here, it may also be called IC, system LSI, super LSI, or ultra LSI depending on the degree of integration.

Further, the method of circuit integration should not be limited to LSI, and it may be implemented with a dedicated circuit or a general-purpose processor. A field programmable gate array (FPGA) that can be programmed after the LSI is manufactured, or a reconfigurable processor that can reconfigure connection and setting of circuit cells inside the LSI may be used.

Further, a part or all of the processing of each functional block of each of the above embodiments may be implemented with a program. A part or all of the processing of each functional block of each of the above-described embodiments is then performed by a central processing unit (CPU) in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware.

Figure 24:
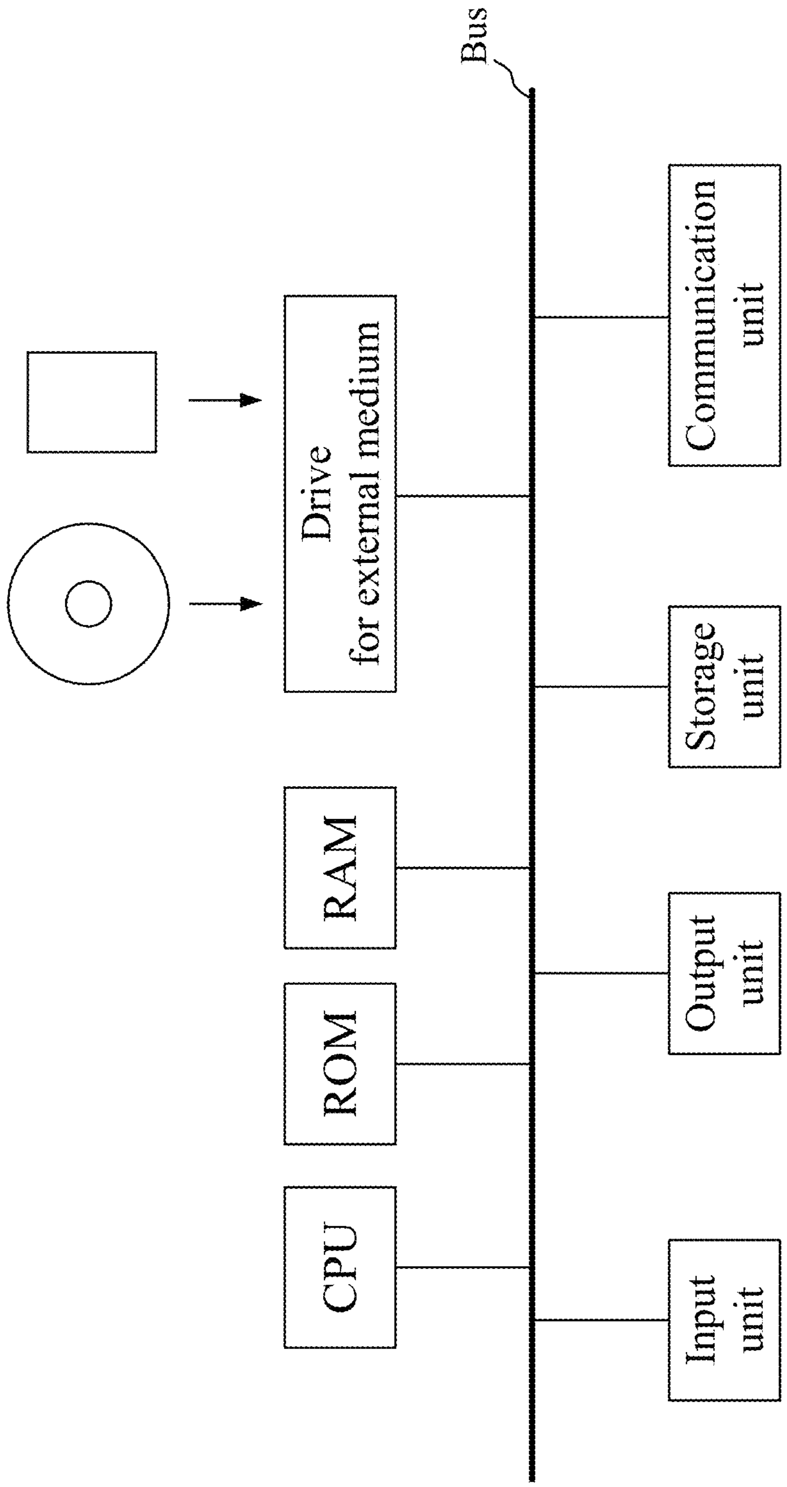
FIG. 24 is a diagram showing a CPU bus configuration.

For example, when each functional unit of the above embodiment is achieved by using software, the hardware structure (the hardware structure including CPU(s), GPU(s), ROM, RAM, an input unit, an output unit, a communication unit, a storage unit (e.g., a storage unit achieved by using HDD, SSD, or the like), a drive for external media or the like, each of which is connected to a bus) shown in FIG. 24 may be employed to achieve the functional units by using software.

When each functional unit of the above embodiment is achieved by using software, the software may be achieved by using a single computer having the hardware configuration shown in FIG. 24, and may be achieved by using distributed processes using a plurality of computers.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiment and a computer readable recording medium on which such a program is recorded. Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program should not be limited to one recorded on the recording medium, but may be transmitted via an electric communication line, a wireless or wired communication line, a network represented by the Internet, or the like.

The specific structures described in the above embodiment are mere examples of the present invention, and may be changed and modified variously without departing from the scope and the spirit of the invention.

APPENDIXES

The present invention can also be achieved as follows.

Appendix 1

An audio synthesis processing device that outputs an audio signal corresponding to an acoustic feature based on Gaussian white noise and the acoustic features, comprising:

a first sub-model unit to an N-th sub-model unit, which are N (N is a natural number satisfying N≥2) sub-model units, wherein the first sub-model unit to the N-th sub-model unit each includes training models that each receive noise level data, an acoustic feature, and an audio signal corresponding to the acoustic feature, and perform training processing so as to output Gaussian white noise from a noise synthesis signal that is a signal obtained by synthesizing the audio signal and Gaussian white noise based on the noise level data, and wherein the first sub-model unit to the N-th sub-model unit each perform training processing of the training models included in the first sub-model unit to the N-th sub-model unit using noise levels each included in different noise level ranges, thereby obtaining trained models.

Appendix 2

The audio synthesis processing device according to appendix 1, further comprising a control unit that sets a noise schedule, wherein the control unit selects a sub-model unit to be used, in performing audio synthesis processing, from the first sub-model unit to the N-th sub-model unit according to the noise level determined based on the noise schedule, and determines an order of processing of the sub-model units that have been selected, wherein the selected sub-model units perform prediction processing using the trained model in the order determined by the control unit to obtain an audio signal according to the acoustic feature.

Appendix 3

The audio synthesis processing device according to appendix 2, wherein the first sub-model unit to the N-th sub-model unit are arranged in descending order from the N-th sub-model unit to the first sub-model unit, the ratio of the noise component of the input noise synthesis signal decreases from the N-th sub-model unit to the first sub-model unit, and the sub-model unit arranged on the front side has a configuration with a faster processing speed than the sub-model unit arranged on the rear side.

Appendix 4

The audio synthesis processing device according to appendix 2, wherein the first sub-model unit to the N-th sub-model unit are arranged in descending order from the N-th sub-model unit to the first sub-model unit, the ratio of the noise component of the input noise synthesis signal decreases from the N-th sub-model unit to the first sub-model unit, and the sub-model unit arranged on the rear side has a configuration with higher processing accuracy than the sub-model unit arranged on the front side.

Appendix 5

The audio synthesis processing device according to any one of Appendices 2 to 4, wherein when the control unit selects sub-model units to be used, in performing audio synthesis processing, from the first sub-model unit to the N-th sub-model unit according to the noise level determined based on the noise schedule, the control unit sets the noise schedule so that the sub-model units to be used are distributed.

Appendix 6

The audio synthesis processing device according to appendix 1, wherein noise level ranges corresponding to the first sub-model unit to the N-th sub-model unit are determined based on the value obtained by taking the logarithm of the noise level, and the first sub-model unit to the N-th sub-model unit each perform the training processing using the noise level included in the noise level range corresponding to the sub-model unit to be processed.

REFERENCE SIGNS LIST

100 audio synthesis processing device
200 signal generation processing device
1, 1A control unit
2_1 to 2_10 first sub-model unit to tenth sub-model unit
2_1A to 2_10A first sub-model unit to tenth sub-model unit
SubM_k k-th sub-model
SubMA_k k-th sub-model

What is claimed is:

1. A signal generation processing device that outputs an audio signal or an image signal from Gaussian white noise, comprising: a first sub-model unit to an N-th sub-model unit, which are N (N is a natural number satisfying N 2) sub-model units, wherein the first sub-model unit to the N-th sub-model unit each includes training models that each receive noise level data, a supervised signal for an audio signal or an image signal, and perform training processing so as to output Gaussian white noise from a noise synthesis signal that is a signal obtained by synthesizing the supervised signal and Gaussian white noise based on the noise level data, and wherein the first sub-model unit to the N-th sub-model unit each perform training processing of the training models included in the first sub-model unit to the N-th sub-model unit using noise levels each included in different noise level ranges, thereby obtaining trained models, a control unit that sets a noise schedule, wherein the control unit selects a sub-model unit to be used, in performing signal generation processing, from the first sub-model unit to the N-th sub-model unit according to the noise level determined based on the noise schedule, and determines an order of processing of the sub-model units that have been selected, wherein the selected sub-model units perform prediction processing using the trained model in the order determined by the control unit to obtain an audio signal or an image signal according to the input condition feature.

2. A signal generation processing device that outputs an audio signal or an image signal corresponding to an input condition feature based on Gaussian white noise and the input condition feature, comprising: a first sub-model unit to an N-th sub-model unit, which are N (N is a natural number satisfying N 2) sub-model units, wherein the first sub-model unit to the N-th sub-model unit each includes training models that each receive noise level data, an input condition feature, and a supervised signal for an audio signal or image signal corresponding to the input condition feature, and perform training processing so as to output Gaussian white noise from a noise synthesis signal that is a signal obtained by synthesizing the supervised signal and Gaussian white noise based on the noise level data, and wherein the first sub-model unit to the N-th sub-model unit each perform training processing of the training models included in the first sub-model unit to the N-th sub-model unit using noise levels each included in different noise level ranges, thereby obtaining trained models, a control unit that sets a noise schedule, wherein the control unit selects a sub-model unit to be used, in performing signal generation processing, from the first sub-model unit to the N-th sub-model unit according to the noise level determined based on the noise schedule, and determines an order of processing of the sub-model units that have been selected, wherein the selected sub-model units perform prediction processing using the trained model in the order determined by the control unit to obtain an audio signal or an image signal according to the input condition feature.

3. The signal generation processing device according to claim 2, wherein the first sub-model unit to the N-th sub-model unit have an order with respect to the ratio of the noise components of the input noise synthesis signal, wherein the order is an order in which the ratio of the noise component of the noise synthesis signal decreases, and the sub-model unit positioned ahead of the order has a faster processing speed than the sub-model unit positioned behind.

4. The signal generation processing device according to claim 2, wherein the first sub-model unit to the N-th sub-model unit have an order with respect to the ratio of the noise components of the input noise synthesis signal, and wherein the order is an order in which the ratio of the noise component of the noise synthesis signal decreases, and the sub-model unit positioned behind of the order has a higher processing accuracy than the sub-model unit positioned ahead.

5. The signal generation processing device according to claim 2, of wherein when the control unit selects sub-model units to be used, in performing signal generation processing, from the first sub-model unit to the N-th sub-model unit according to the noise level determined based on the noise schedule, the control unit sets the noise schedule so that the sub-model units to be used are distributed.

6. The signal generation processing device according to claim 1, wherein noise level ranges corresponding to the first sub-model unit to the N-th sub-model unit are determined based on the value obtained by taking the logarithm of the noise level, and the first sub-model unit to the N-th sub-model unit each perform the training processing using the noise level included in the noise level range corresponding to the sub-model unit to be processed.

7. The signal generation processing device according to claim 3, wherein when the control unit selects sub-model units to be used, in performing signal generation processing, from the first sub-model unit to the N-th sub-model unit according to the noise level determined based on the noise schedule, the control unit sets the noise schedule so that the sub-model units to be used are distributed.

8. The signal generation processing device according to claim 4, wherein when the control unit selects sub-model units to be used, in performing signal generation processing, from the first sub-model unit to the N-th sub-model unit according to the noise level determined based on the noise schedule, the control unit sets the noise schedule so that the sub-model units to be used are distributed.

9. The signal generation processing device according to claim 2, wherein noise level ranges corresponding to the first sub-model unit to the N-th sub-model unit are determined based on the value obtained by taking the logarithm of the noise level, and the first sub-model unit to the N-th sub-model unit each perform the training processing using the noise level included in the noise level range corresponding to the sub-model unit to be processed.

* * * * *